(12) United States Patent
Scotchmer et al.

(10) Patent No.: US 11,077,516 B2
(45) Date of Patent: Aug. 3, 2021

(54) VIBRATING WELDING APPARATUS AND METHOD

(71) Applicant: HUYS INDUSTRIES LIMITED, Weston (CA)

(72) Inventors: Nigel Scotchmer, Willowdale (CA); Franklin Rementer, Dover, DE (US)

(73) Assignee: Huys Industries Limited

(*) Notice: Subject to any disclaimer, the term of this patent is extended or adjusted under 35 U.S.C. 154(b) by 359 days.

(21) Appl. No.: 15/856,146

(22) Filed: Dec. 28, 2017

(65) Prior Publication Data

US 2018/0178308 A1    Jun. 28, 2018

Related U.S. Application Data

(60) Provisional application No. 62/439,691, filed on Dec. 28, 2016, provisional application No. 62/581,496, filed on Nov. 3, 2017.

(51) Int. Cl.
*B23K 9/30* (2006.01)
*B23K 11/11* (2006.01)
(Continued)

(52) U.S. Cl.
CPC .......... *B23K 9/30* (2013.01); *B23K 9/04* (2013.01); *B23K 9/0953* (2013.01);
(Continued)

(58) Field of Classification Search
CPC .......... B23K 37/02; B23K 37/0282; B23K 37/0288; B23K 11/11; B23K 9/04;
(Continued)

(56) References Cited

U.S. PATENT DOCUMENTS 3,445,623 A    5/1969  Fukushima
4,356,378 A *  10/1982 Cloos ............... B23K 9/287
                                                219/124.1
(Continued)

FOREIGN PATENT DOCUMENTS

CA    2871185 A1    6/2015
CN    201824106 U    5/2011
(Continued)

OTHER PUBLICATIONS

English machine translation of CN201824106, published May 11, 2011.

*Primary Examiner* — Vishal Pancholi
*Assistant Examiner* — Bob Zadeh
(74) *Attorney, Agent, or Firm* — Ridout & Maybee LLP

(57) ABSTRACT

A welding electrode apparatus may be mounted to a robot that presents it to a workpiece along a pre-programmed path conforming to the surface of the workpiece. The welding electrode apparatus has a first drive for rotating the welding electrode about its own axis. The electrode handle has a second rotating drive having an imbalance to impose vibration on the welding rod transverse to the axis of the rod. The first drive may turn relatively slowly; the second drive may turn more quickly. The first drive has an electrical pickup by which to carry DC power to the electrode. The two rotating drives impose two frequencies of vibration into the apparatus, causing a make-and-break contact for low power spark deposition, while at the same time causing the electrode to bounce and impact the surface. The forward end of the apparatus may include a cowling and a delivery line to provide shielding gas to the electrode.

19 Claims, 35 Drawing Sheets

(51) Int. Cl.
*B23K 9/10* (2006.01)
*B23K 9/095* (2006.01)
*B23K 9/173* (2006.01)
*B23K 9/04* (2006.01)

(52) U.S. Cl.
CPC ............ *B23K 9/1006* (2013.01); *B23K 9/173* (2013.01); *B23K 11/11* (2013.01)

(58) Field of Classification Search
CPC .... B23K 9/0953; B23K 9/1006; B23K 9/173; B23K 9/30; F41G 1/02; G06F 3/147; G09G 2380/06; G09G 5/003; H02J 7/00; H04B 1/3888; H04M 1/0202; H04M 1/0254; H04M 1/026; H04M 1/03; H04M 1/035; H04M 1/185; H04M 1/6041
See application file for complete search history.

(56) References Cited

U.S. PATENT DOCUMENTS

| | | | |
|---|---|---|---|
| 4,365,137 A | 12/1982 | Tarasov et al. | |
| 4,405,851 A | 9/1983 | Sheldon | |
| 4,703,156 A | 10/1987 | Hayes | |
| 5,448,035 A | 9/1995 | Thutt et al. | |
| 5,536,912 A | 7/1996 | Staschewski | |
| 6,295,708 B1 * | 10/2001 | Spaid | B23K 9/32 29/81.02 |
| 6,380,505 B1 * | 4/2002 | Stoops | B23K 9/0286 219/125.11 |
| 6,417,477 B1 * | 7/2002 | Brown | B23K 9/04 219/76.13 |
| 6,444,951 B1 | 9/2002 | Paxton et al. | |
| 8,642,922 B2 | 2/2014 | Flattinger et al. | |
| 9,126,292 B2 | 9/2015 | Chen et al. | |
| 9,168,606 B2 | 10/2015 | Lin et al. | |
| 2005/0284848 A1 * | 12/2005 | Martin Gonzalez | B23K 11/0053 219/93 |
| 2014/0050938 A1 | 2/2014 | Lin et al. | |
| 2014/0120308 A1 | 5/2014 | Lin et al. | |
| 2014/0138358 A1 | 5/2014 | Lin et al. | |
| 2015/0076120 A1 * | 3/2015 | Pagano | B23K 9/0213 219/74 |
| 2015/0165538 A1 | 6/2015 | Shijie et al. | |
| 2015/0183042 A1 | 7/2015 | Scotchmer et al. | |
| 2018/0178308 A1 * | 6/2018 | Scotchmer | B23K 9/0953 |

FOREIGN PATENT DOCUMENTS

| | | |
|---|---|---|
| EP | 2684981 A2 | 7/2013 |
| EP | 2664404 A2 | 11/2013 |
| GB | 428396 A | 5/1935 |
| GB | 2215250 A | 9/1989 |
| WO | 2014138891 A1 | 9/2014 |

* cited by examiner

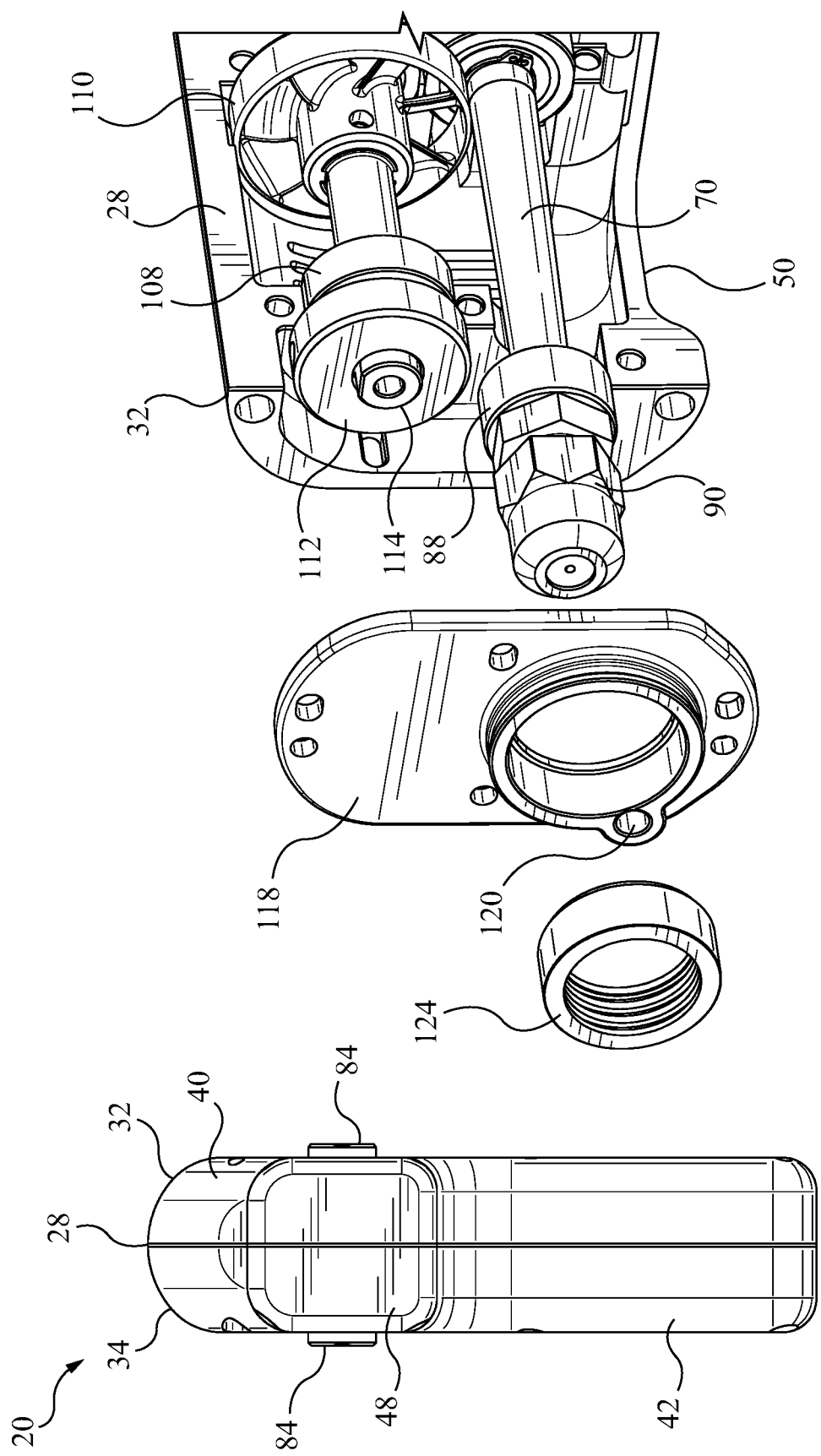

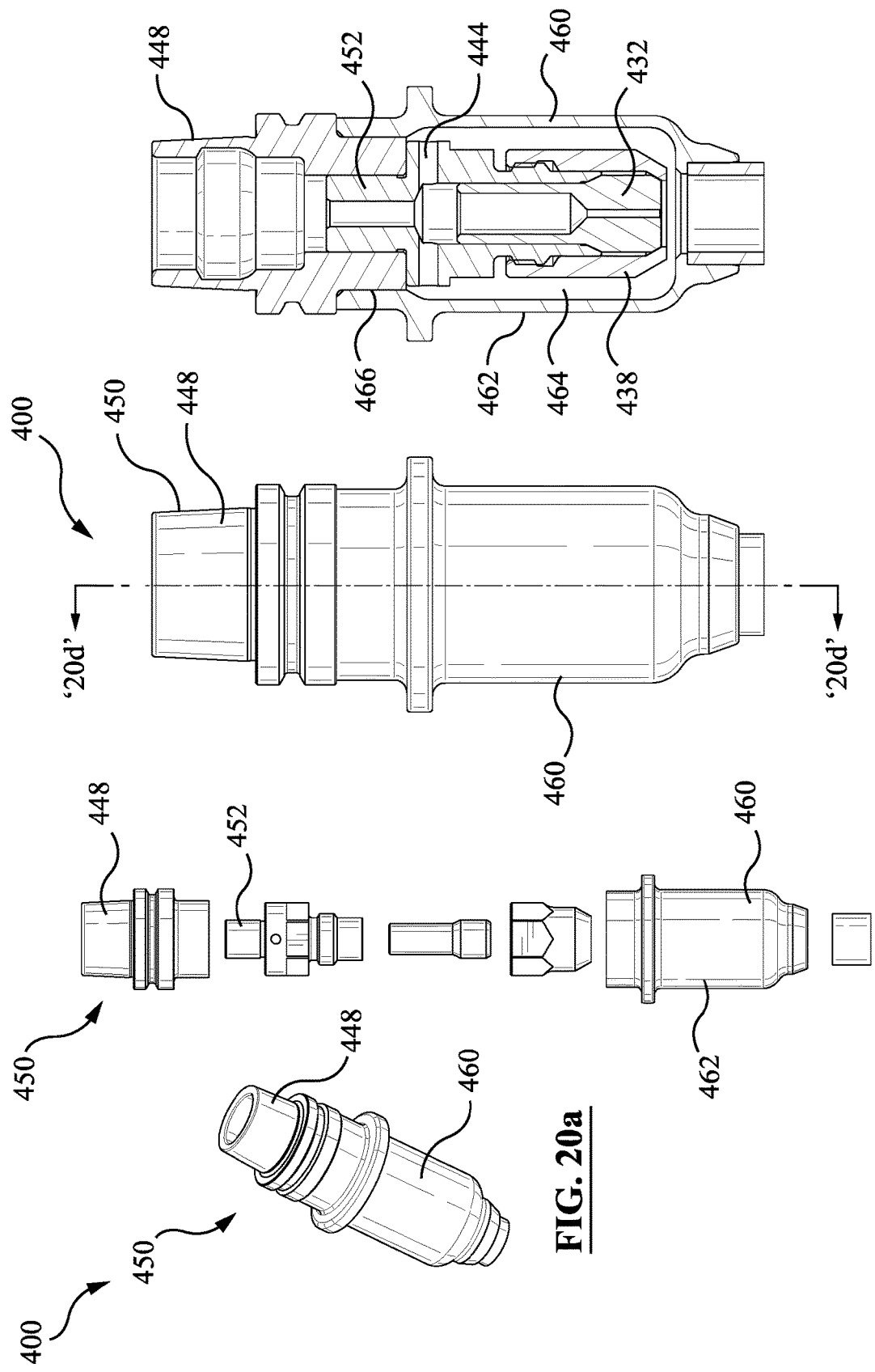

ical connection attached to the holder, by which to apply
VIBRATING WELDING APPARATUS AND METHOD This application claims the benefit of the priority of U.S. Ser. No. 62/439,691 filed Dec. 28, 2016; and of U.S. Ser. No. 62/581,496 filed Nov. 3, 2017, the specifications and drawings thereof being incorporated herein by reference.

FIELD OF THE INVENTION

This Application relates to a tool for holding an electrode, and operation thereof.

BACKGROUND OF THE INVENTION

In a number of industries it may be helpful to be able to coat a metal substrate having certain desired qualities with a coating of a dissimilar material having other properties. For example, in some cases it may be desirable to coat a metal substrate with a ceramic surface coating. Sometimes the coating is added for wear resistance. In the electro-spark deposition (ESD) process, a consumable electrode material is brought into contact with a metallic base surface to be treated to deposit a ceramic coating on the metallic substrate.

One such application may be for the coating of existing parts by a deposition process. Another application may occur where it is desired to remove or repair defects in the surface of a substrate, whether as a planar surface or as part of a non-planar three-dimensional object. Another application may pertain to welding electrodes for use in a production line for the sequential assembly of parts using a large number of welding stations. Welding electrodes are generally made of copper. The electrode may have a surface coating, such as a ceramic coating, that may be intended to increase electrode life. Other objects, such as steel may be provided with a surface coating, such as nickel or chrome. For example, coatings of vanadium-carbide, tungsten-carbide, titanium-diboride, zirconium-diboride, Titanium-carbide, $Cr_3C_2$, and so on, might be applied to tool steels or aluminum, or other metals, as may be. Such treatments, or coatings, or repairs may occur where it is desired to change the surface, or near surface properties of an object, such as hardness, or corrosion resistance or other property.

The surface area will be coated with a layer of the electrode material when swept by the electrode. The electrode cap may be mounted to a moving device. The condition of the contact may be dependent on the relative motion of the rod of depositing electrode coating material and the electrode cap to be coated.

SUMMARY OF THE INVENTION

In an aspect of the invention there is a welding apparatus for holding a welding electrode, the welding electrode having a long axis. The welding apparatus has a holder in which to receive the welding electrode. There is an electrical connection attached to the holder, by which to apply electricity thereto, and thereby, in use, to the welding electrode. A first drive is mounted to rotate the electrode holder, and thereby, in use, to cause the welding electrode to rotate about the long axis thereof. It has an imbalance member, and a second drive mounted to rotate the imbalance member about an axis off-set from the long axis of the welding electrode.

In a feature of that aspect of the invention, the second drive is operable at a different frequency from the first drive. In another feature, the first drive is a DC motor and the second drive is an AC motor. In still another feature, either of said first drive and said second drive is a variable speed drive. In yet another feature, the second drive has an axis of rotation parallel to the first drive. In still another feature, the tool holder has a gas shield cowling, and said apparatus includes a gas conduit connection having a discharge oriented to convey gas within said cowling. In a further feature, the apparatus has a laterally extending trigger handle. In still another feature, an impeller is mounted to the second drive. The impeller is driven to ventilate the apparatus. In a yet further feature, the apparatus has a housing, and the first and second drives are mounted on parallel axes within that housing. In another feature, the second drive is independently operable from the first drive.

In another feature, the first drive has a feedback control connected to govern output speed. In an additional feature, the feedback control includes a digital encoder sensor mounted to observe output of the first drive, and a digital controller operable to adjust motor drive speed in response thereto. In still another feature, the first drive includes a gear reducer. In a further feature, the holder in which to receive the welding electrode is liquid cooled. In another feature, the first drive has an output speed in the range of 100 to 500 rpm. In a yet further feature, the second drive has an output speed of 300 to 3000 rpm. In still another feature, the apparatus includes an inert gas delivery manifold.

In another aspect of the invention, there is a welding apparatus for holding a welding electrode. The welding electrode has a long axis. The welding apparatus includes a holder in which to receive the welding electrode; an electrical connection attached to the holder, by which to apply electricity thereto, and thereby, in use, to the welding electrode; a first drive mounted to rotate the electrode holder, and thereby, in use, to cause the welding electrode to rotate about the long axis thereof; and a feedback controller mounted to govern the first drive.

In a feature of that aspect of the invention, the feedback controller has a sensor mounted to monitor output rotation of the holder, and an output operable to govern motor speed in response thereto. In another feature, the sensor includes a digital encoder, and speed of the first drive is digitally controlled. In a further feature, the welding apparatus has an oscillator mounted thereto. In yet another feature, the oscillator includes a second drive, the second drive including a motor and a rotational imbalance driven by the motor. In an additional feature, the second drive has an output speed of between 300 rpm and 3000 rpm. In another additional feature, the first drive has an output speed in the range of 100 to 500 rpm. In yet another feature, the first drive includes a gear reducer. In a yet further feature, the holder is liquid cooled. In another feature, the apparatus has an inert gas delivery manifold mounted to bathe the electrode. In a further feature, the apparatus has a removable front cover.

In yet another aspect of the invention there is a welding apparatus for holding a welding electrode. The welding electrode has a long axis. The welding apparatus includes a holder in which to receive the welding electrode; an electrical connection attached to the holder, by which to apply electricity thereto, and thereby, in use, to the welding electrode; a first drive mounted to rotate the electrode holder, and thereby, in use, to cause the welding electrode to rotate about the long axis thereof. The electrode holder is liquid cooled.

In a feature of that aspect, a liquid cooling jacket surrounds the electrode holder. In another feature the apparatus has an inert gas supply manifold having a discharge enveloping the electrode. In another feature, a feedback controller governs the first drive. In a further feature, the feedback controller has a sensor that monitors output rotation of the holder, and an output operable to govern motor speed in response thereto. The sensor includes a digital encoder, and speed of the first drive is digitally controlled. In another feature, the welding apparatus has an oscillator mounted thereto. In an additional feature, the oscillator includes a second drive including a motor and a rotational imbalance driven by the motor. In another feature the second drive has an output speed of between 300 rpm and 3000 rpm. In still another feature, the first drive has an output speed in the range of 100 to 500 rpm. In another feature, the first drive includes a gear reducer. In another feature, the apparatus has an inert gas delivery manifold mounted to bathe the electrode.

In another aspect of the invention there is an automated welding apparatus for holding a welding electrode, the welding electrode having a long axis. The welding apparatus has a multi-degree-of-freedom programmable robot. A welding head is mounted to the robot. The welding head includes a holder in which to receive the welding electrode. There is an electrical connection attached to the holder, by which to apply electricity thereto, and thereby, in use, to the welding electrode. A first drive is mounted to rotate the electrode holder, and thereby, in use, to cause the welding electrode to rotate about the long axis thereof. There is an imbalance member, and a second drive mounted to move the imbalance member. The second drive is off-set laterally from the long axis of the welding electrode.

In a feature, the second drive is operable at a different output frequency from the first drive. The first drive is a DC motor and the second drive is an AC motor. Either of the first and second drives is a variable speed drive. The second drive has an axis of rotation parallel to the first drive. In another feature, the tool holder has a gas shield cowling, and the apparatus includes a gas conduit connection having a discharge oriented to convey gas within the cowling.

The apparatus has a laterally extending trigger handle. In another feature, an impeller is mounted to the second drive and is driven to ventilate the apparatus. In another feature, the apparatus has a housing, and the first and second drives are mounted on parallel axes within the housing. The second drive is independently operable from the first drive. In still another feature, the first drive has a feedback control connected to govern output speed. The feedback control includes a digital encoder sensor mounted to observe output of the first drive, and a digital controller operable to adjust motor drive speed in response thereto. In another feature, the first drive includes a gear reducer. In yet a further feature, the holder in which to receive the welding electrode is liquid cooled. The first drive has an output speed in the range of 100 to 500 rpm. The second drive has an output speed of 300 to 3000 rpm. In still another feature, the apparatus includes an inert gas delivery manifold.

In still another feature, the first drive has a feedback controller. The second drive is a rotational drive offset having an axis of rotation parallel to the first drive; the second drive is independent of the first drive; and the holder is liquid cooled. In another feature, the welding apparatus has a resilient mounting by which the welding head is mounted to the robot. In a further feature, the welding head includes a base mounted to the robot, a carriage slidably mounted to the base; and a drive mounted controllably to move the carriage relative to the base. In a still further feature, the motion of the carriage relative to the slide is feedback controlled. In another feature, the holder includes a chuck, and the chuck is a quick-release chuck for cooperation with an automatic tool changer. In still yet another feature, the robot is programmable to convey the welding head along a path corresponding to a workpiece surface.

In another aspect, there is a method of using to treat a workpiece. It includes operating the robot to convey the welding head along a path corresponding to a workpiece surface; advancing the welding rod to engage to engage the workpiece; driving the rod rotationally about its own axis; and vibrating the rod independently of driving the rod rotationally.

In a feature of that aspect of the invention, the method includes monitoring contact force on the welding rod and adjusting welding rod extension in response to force monitored on the welding rod. In another feature the method includes adjusting both welding rod extension and rotational speed of the welding rod in response to feedback. In a further feature, the method includes adjusting electrical duty cycle of electrical current to the welding rod as the robot moves the welding head relative to the workpiece. In another feature, the method includes automated replacement of the welding rod. In another feature, the method includes automated replacement of the welding rod with a welding rod of a different composition of material. In still another feature the method includes removing the welding rod and mounting a tool other than a welding tool to the welding head instead.

In yet another aspect of the invention, there is a welding apparatus for use with a welding electrode having a long axis. The welding apparatus includes a robot and a welding head mounted to the robot. The robot is programmed to convey the welding head along a path relative to a workpiece. The welding head has a welding electrode holder in which to receive the welding electrode. An electrical connection is attached to the holder, by which to apply electricity thereto, and thereby, in use, to the welding electrode. A first drive is mounted to rotate the electrode holder, and thereby, in use, to cause the welding electrode to rotate about the long axis thereof. A feedback controller mounted to govern the first drive.

In a feature of that aspect, the feedback controller has a sensor mounted to monitor output rotation of the holder, and an output operable to govern motor speed in response thereto. In another feature, the sensor includes a digital encoder, and speed of the first drive is digitally controlled. In another feature, the welding apparatus has an oscillator mounted thereto. In a further feature, the oscillator includes a second drive, the second drive including a motor and a rotational imbalance driven by the motor. In another feature, the second drive has an output speed of between 300 rpm and 3000 rpm. In a further feature, the first drive has an output speed in the range of 100 to 500 rpm. In still another feature, the holder is liquid cooled. In yet another feature the apparatus has an inert gas delivery manifold mounted to bathe the electrode.

In another feature, the welding head includes a base mounted to the robot, a carriage slidably mounted to the base; and a drive mounted controllably to move the carriage relative to the base. In a further feature, the robot is programmable to convey the welding head along a path corresponding to a workpiece surface; and motion of the carriage relative to the slide is feedback controlled.

In another aspect of the invention, there is a welding apparatus for holding a welding electrode, the welding electrode having a long axis. The welding apparatus includes a holder in which to receive the welding electrode, and an electrical connection is attached to the holder, by which to apply electricity thereto, and thereby, in use, to the welding electrode. A first drive is mounted to rotate the electrode holder, and thereby, in use, to cause the welding electrode to rotate about the long axis thereof. The electrode holder being liquid cooled.

In a feature of that aspect, a liquid cooling jacket surrounds the electrode holder. In another feature, the apparatus includes an inert gas supply manifold that has a discharge enveloping the electrode. In another feature, a feedback controller is mounted to govern the first drive. In a further feature, the feedback controller has a sensor mounted to monitor output rotation of the holder, and an output operable to govern motor speed in response thereto, the sensor includes a digital encoder, and speed of the first drive is digitally controlled.

In yet another feature, the welding apparatus has an oscillator mounted thereto. In an additional feature, the oscillator includes a second drive, the second drive including a motor and a rotational imbalance driven by the motor. In another feature, the second drive has an output speed of between 300 rpm and 3000 rpm. In another feature, the first drive has an output speed in the range of 100 to 500 rpm. In a further feature, the first drive includes a gear reducer. In still another feature the apparatus has an inert gas delivery manifold mounted to bathe the electrode.

In another aspect of the invention there is any combination of any of the features of any one of embodiments shown or described herein, in combination with the features of any other embodiment, except to the extent those features are mutually exclusive. In another aspect of the invention, there is any apparatus substantially as shown or described herein, in whole or in part.

BRIEF DESCRIPTION OF THE DRAWINGS

These aspects and other features of the invention can be understood with the aid of the following illustrations of a number of exemplary, and non-limiting, embodiments of the principles of the invention in which:

FIG. 5 is an end view of the apparatus of FIG. 1;

FIG. 6 is an exploded perspective view of the forward end of the apparatus of FIG. 1;

FIG. 9b shows an enlarged perspective view of a detail of FIG. 9a;

FIG. 10b is a side view of the apparatus of FIG. 10a;

FIG. 11a is a perspective view of an alternative embodiment of the welding apparatus of FIG. 10a;

FIG. 11b is a side view of the embodiment of FIG. 11a;

FIG. 12a is a perspective view with near side half shell cover removed of a still further alternative embodiment to that of FIG. 9a; and FIG. 12b is a side view of the welding apparatus of FIG. 12a.

FIG. 14a shows a left hand side view of the coating apparatus of FIG. 13a;

FIG. 14b shows a front view of the welding or coating apparatus of FIG. 14a;

FIG. 14c shows a right and view of the coating apparatus of FIG. 14a;

FIG. 14d shows a rear view of the coating apparatus of FIG. 14a;

FIG. 14e shows a top view of the coating apparatus of FIG. 14a;

FIG. 14f shows a bottom view of the coating apparatus of FIG. 14a;

FIG. 15a shows front view of the spindle housing of the apparatus of FIG. 14a;

FIG. 16c shows a perspective view of from the left front of the coating head of the coating apparatus of FIG. 14a;

FIG. 16d shows a perspective view from the rear right of the coating head for the coating apparatus of FIG. 14a;

FIG. 17a shows a perspective view, from the right front, of a base or slide assembly of the coating apparatus of FIG. 14a;

FIG. 17b shows a perspective view from the left front of the assembly of FIG. 17a;

FIG. 19a shows a manual release chuck for the tool of FIG. 18a;

FIG. 19b is an exploded view of the chuck of FIG. 19a;

FIG. 19c is a side view of the chuck of FIG. 19a;

FIG. 19d is a cross-sectional view of the chuck of FIG. 19c on '19d-19d' of FIG. 19c on the vertical centerline plane;

FIG. 20a shows a quick release chuck for the tool of FIG. 18a;

FIG. 20b is an exploded view of the chuck of FIG. 20a;

FIG. 20c is a side view of the chuck of FIG. 20a; and

FIG. 20d is a cross-sectional view of the chuck of FIG. 19c on '20d-20d' of FIG. 20c on the vertical centerline plane.

DETAILED DESCRIPTION

Figure 1:
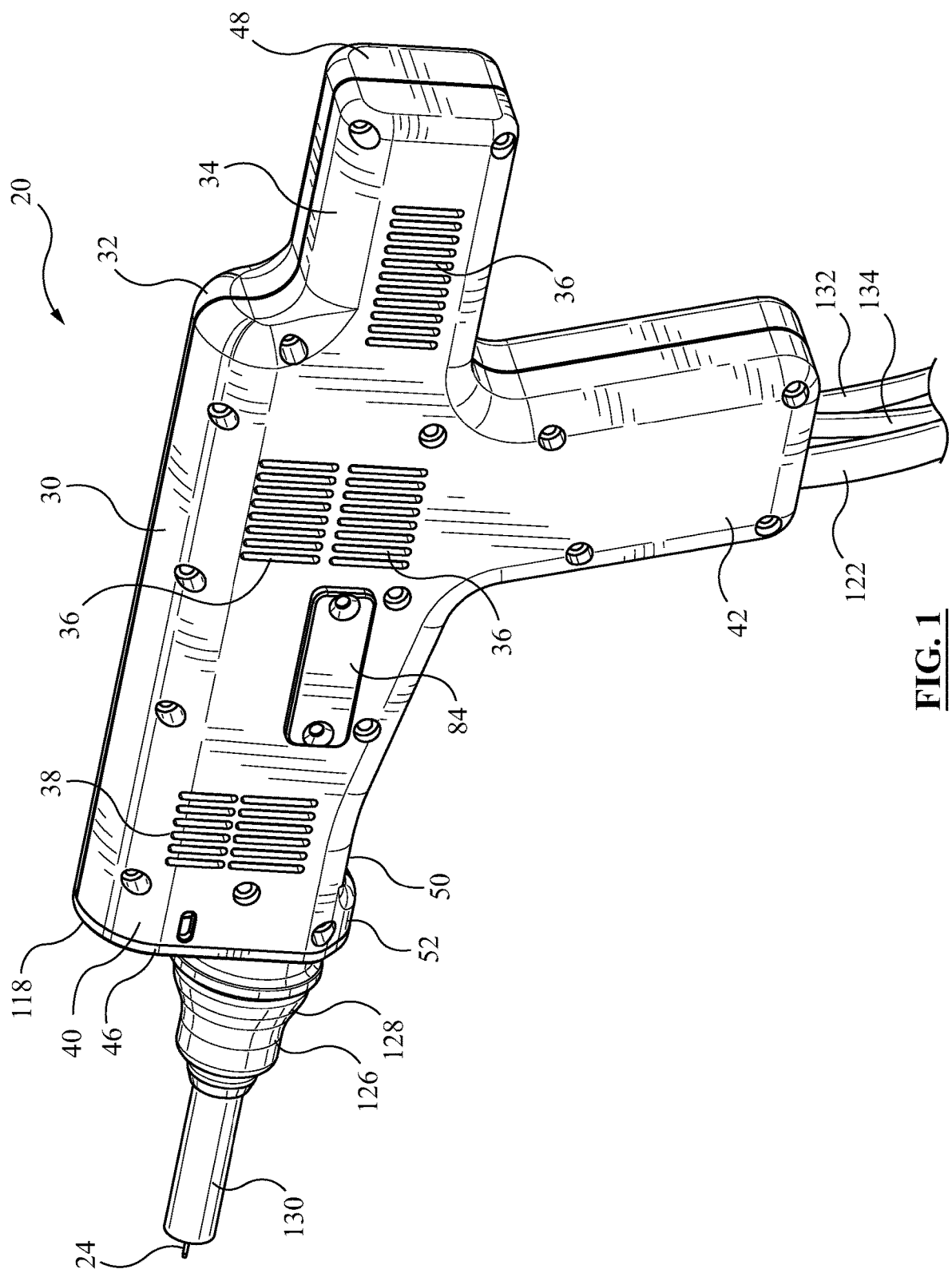
FIG. 1 shows a perspective view of a welding apparatus for holding a welding electrode.
Figure 2:
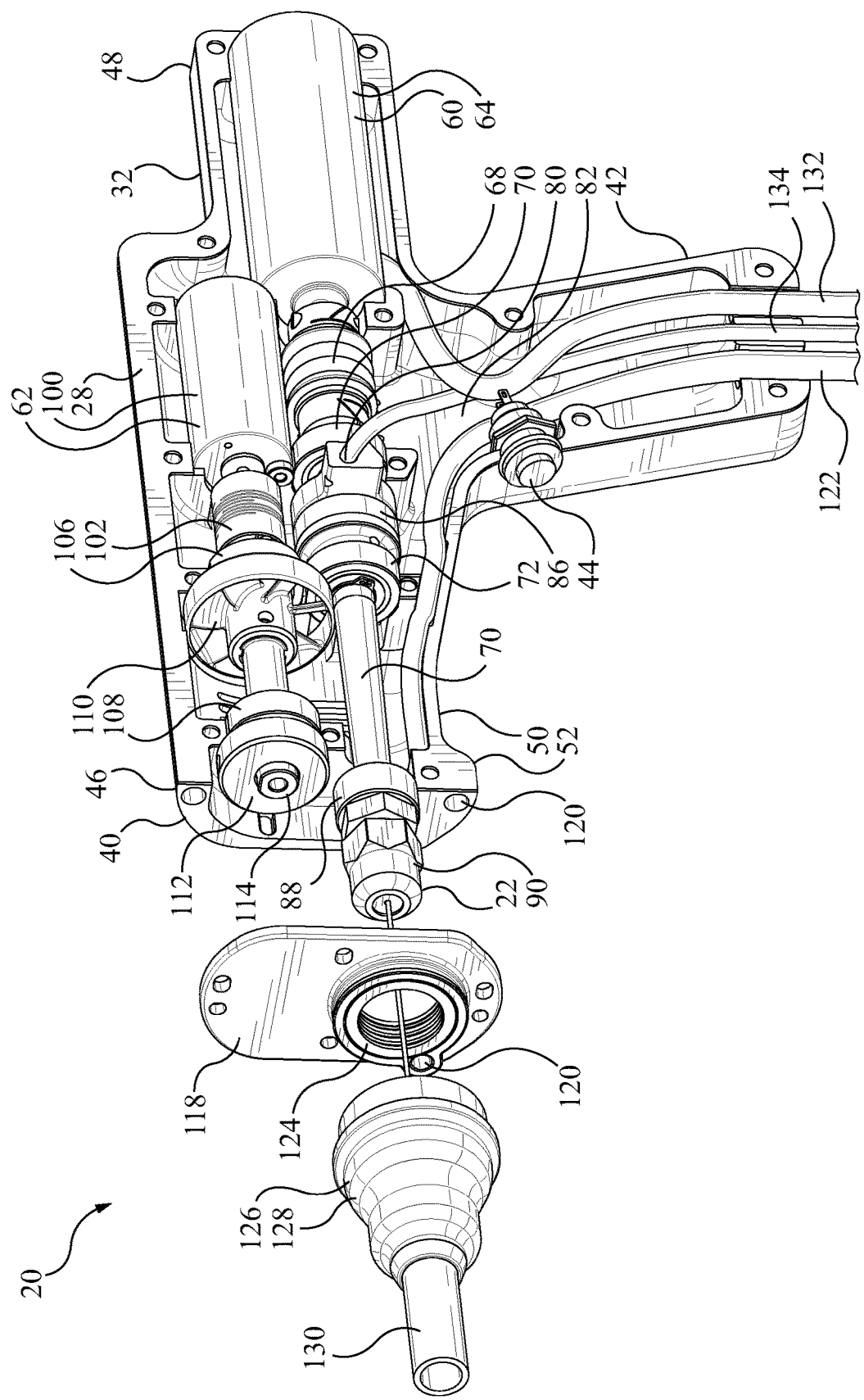
FIG. 2 shows an exploded perspective view of the apparatus of FIG. 1 with near side exterior shell removed to reveal internal details.
Figure 3:
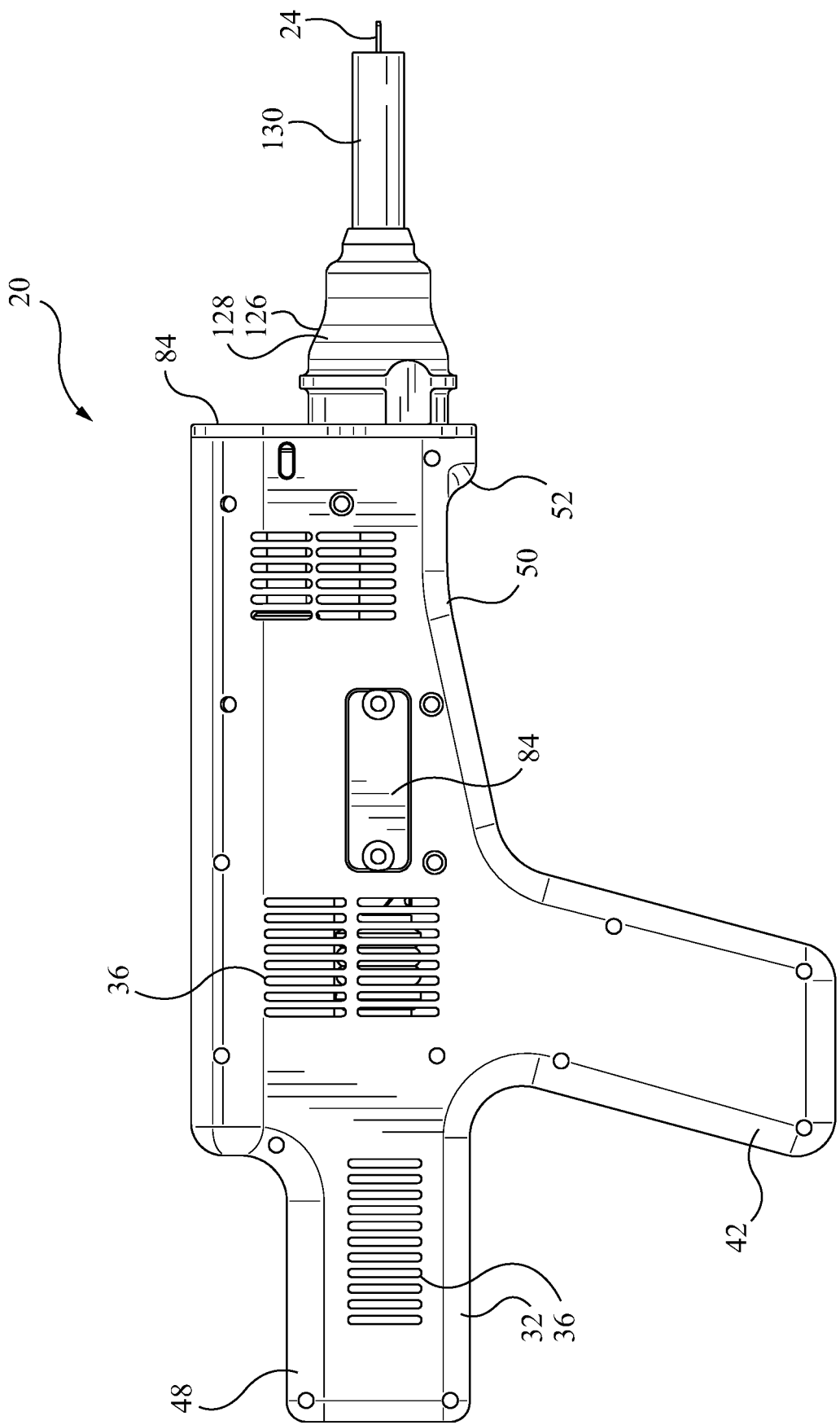
FIG. 3 is a right-hand side view of the apparatus of FIG. 1.

The description that follows, and the embodiments described therein, are provided by way of illustration of an example, or examples, of particular embodiments of the principles of the invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification many be translated, without being limited to specific words or phrases.

For the purposes of this description, a Cartesian frame of reference may be employed. In such a frame of reference, the long, or largest, dimension of an object may be considered to extend in the direction of the x-axis, being the longitudinal axis and the main axis of rotation. The height of the object is measured in the z-direction, and the lateral distance from the central vertical plane is measured in the y-direction. Unless noted otherwise, the terms "inside" and "outside", "inwardly" and "outwardly", refer to location or orientation inside the housing of the apparatus. In this specification, the commonly used engineering terms "proud", "flush" and "shy" may be used to denote items that, respectively, protrude beyond an adjacent element, are level with an adjacent element, or do not extend as far as an adjacent element, the terms corresponding conceptually to the conditions of "greater than", "equal to" and "less than". Unless otherwise noted, the assembly shown and described herein may tend to be symmetrical, or largely symmetrical, about the vertical longitudinal central plane. In this specification distinction may be made between materials that are thermal conductors and thermal insulators. In general, the thermal conductors may be thought of as materials such as metals, such as steel, stainless steel, copper sheathing, mild steel flashing, whether galvanized or otherwise, or aluminum sheeting or aluminum extrusions, painted or otherwise. The insulators may be thought of as materials such as wood, particle board, oriented strand board, composites, and plastics, whether fiber reinforced or otherwise.

The embodiments illustrated and described above illustrate non-limiting examples in which the principles of the present invention are employed. It is possible to make other embodiments that employ the principles of the invention and that fall within the following claims. To the extent that the features of those examples are not mutually exclusive of each other, the features of the various embodiments may be mixed-and-matched, i.e., combined, in such manner as may be appropriate, without having to resort to repetitive description of those features in respect of each possible combination or permutation. The invention is not limited to the specific examples or details given by way of illustration herein, but only by a purposive interpretation of the claims to include equivalents under the doctrine of equivalents.

By way of general overview, a welding apparatus, such as may be identified as an electrode handle apparatus, or simply as a electrode handle, is shown in FIG. 1 as 20. Handle 20 has an electrode holder, indicated generally as 22, in which an electrode 24 is mounted. Electrode 24 has a cylindrical shape, and is relatively long and thin. Electrode 24 may be a semi-conducting material, such as titanium carbide, titanium di-boride, or such other welding rod material, as may be. The outwardly extending tip of electrode 24 is seen positioned toward an object with which electrode 24 is to interact, i.e., that is to be subject to welding.

Considering again handle 20, there is housing, or backshell, or haft, or body, generally indicated as 30. Housing 30 includes first and second portions 32, 34, which may be referred to as first and second, or left hand and right hand backshell or housing halves or housing portions. First and second housing portions 32, 34 are held together by an array of fasteners such as may be in the nature of threaded cap screws 26 spaced thereabout. A gasket 28 may be captured between portions 32, 34, and compressed by the tightening of screws 26. Both backshell halves may have porting in the nature of vents such as inlet vent array 36 and outlet vent array 38, by which air or other gas coolant may be admitted to, and enabled to depart from, the interior of housing 30. The backshell halves may be made of an electrically non-conductive, or electrically insulating, material. The girth of housing 30 may be suitable for being grasped or cradled in the hand of an operator. The general proportions of housing 30 are such that it may have a through dimension in the transverse or y-direction of the order of 2 inches.

As assembled, housing 30 may be generally gun-shaped, i.e., it has a main body or barrel, or longitudinal portion 40, and a predominantly transversely projecting hand grip portion 42. Portion 42 may have a trigger, or activator, or switch 44. Handle 20 has a forward end, or nose, 46 from which the welding electrode protrudes or advances in operation, and a rearward end or butt, or tail 48 that extends rearwardly of grip portion 42. The underside of forward end 46 is somewhat flared or bulbous as at 52, such that a recess 50 is formed rearwardly thereof. In use, the operator may support apparatus 20 with one hand in recess 50, thereby cradling apparatus 20, while the other hand holds grip portion 42 and operates switch 44. Switch 44 may be a variable speed switch, e.g., in which the maximum speed of rotation of the first drive is adjusted by rotation of the switch about its axis, and the on-off function, and the speed of the motor between zero and maximum selected speed is governed by how far the trigger is depressed axially. The desired speed may be set, and the switch is squeezed the full distance to that speed.

Looking at the inside of apparatus 20, each half portion 32, 34 forms a cavity. The halves are molded to define cavities (or two halves of one cavity) in which to receive the controller, circuitry, and rotating elements of handle 20. There is a first rotating assembly 60, and a second rotating assembly 62. Each has a respective axis of rotation, which is, or may be considered to be, or substantially to be, parallel to the long direction of the main body or longitudinal portion 40. The axis of rotation of assembly 62 is transversely offset from, and may conveniently be parallel to, the axis of rotation of assembly 60.

Starting with assembly 60, and proceeding from the rear of the unit to the front, a first drive in the form of a motor 64 is rearmost. The body or housing of motor 64 fits into a pre-formed moulded seat in the backshell or housing, there being a corresponding half-seat in the other housing half. The output shaft of motor 64 extends forwardly to mate with the input of a coupling or clutch 68. Main drive shaft 70 has a first end that engages the output side of clutch 68. Clutch 68 is an insulating coupling that electrically isolates motor 64 from shaft 70. Clutch 68 may also compensate for any misalignment between motor 64 and shaft 70.

Near end bearing 72 and intermediate bearing 74 are provided to carry main shaft 70. Near end bearing 72 is located at, or close to, the clutch-connected end of main shaft 70. Intermediate bearing 74 is located at roughly the half-way, or mid-point, of main shaft 70, such that a first portion 76 of shaft 70 is carried between bearings 72 and 74, and a second portion 78 is cantilevered forwardly away from bearing 74. An electrical power pick-up 80 mounts on shaft 70 near first bearing 72. Power pick-up ring, 80 may typically be made of copper, and is connected to the welding power cable 82. In operation, ring 80 is held stationary. Ring 80 is externally accessible through a slot or port covered by external cover plates 84 located on the outside of housing portions 32 and 34 forward of the rearward set of air vent ports. A slip ring 86 is mounted axially forward of pick-up ring 80. Slip ring 86 may be a carbon-lined slip ring. It bears against main shaft 70 and against pick-up ring 80. In operation it carries electrical current from pick-up ring 80 into shaft 70. The distal, of most forward end of shaft 70 is enlarged at a forward shoulder into a head 88 that has a mating threaded chuck. Chuck 90 and head 88 co-operate to define a seat or accommodation for the inward end of welding rod 24, chuck 90 being releasable to permit replacement of rod 24, and may be tightened to secure rod 24 in place, or to adjust the protruding length of rod 24.

As noted, a second drive in the form of a second rotating assembly 62 is transversely offset from first rotating assembly 60. It includes a motor 100, and isolation coupling 102, a second shaft 104 (i.e., the first shaft being main shaft 70); a pair of near and far bearings 106, 108; an impeller 110; an eccentric weight 112 and an eccentric weight retainer 114. Motor 100 fits in a molded seat in the housing shell. In this instance, it is nested just forward of motor 64, above coupling 68. Shaft 104 is carried in bearings 106, 108, with coupling 102 being located between bearing 106 and motor 100. Shaft 104 is keyed or splined forwardly of bearing 106, for mating with corresponding key or spline fitting of the hub of impeller 110, to be able to impart torque to impeller 110, and thereby to drive impeller 110 to force air to flow through the inlet and outlet vents or ports to permit cooling of the elements inside the housing. Impeller 110 is held axially in place by a transverse roll pin or grub screw. Bearing 108 is spaced axially forward of impeller 110, and is located between a pair of circlips.

The second drive is an oscillator used to provide a vibrational forcing function to apparatus. To that end, an imbalance, in the form of eccentric weight 112 is mounted forward of bearing 108, and is held in place by removable retainer 114. Eccentric weight 112 may therefore be removed and replaced or adjusted to provide a different imbalance, as may suit. Although a rotational eccentric weight is shown, a linearly reciprocating element could also be used. It does not matter that shaft 100 be precisely parallel to shaft 70, although it is convenient for making a compact design. Shaft 100 merely needs to be such that rotation of eccentric weight 112 results in a forcing function having a varying component of force in a transverse direction relative to shaft 64, such as to cause oscillation therein (and, ultimately, at the tip of welding rod 24).

At the front end or nose of apparatus 20 there is a closure member or closure plate 118, that permits access to the inside of handle 20 without having to take the two backshell halves apart. This access permits adjustment of eccentric weight 112. Plate 118 may also have a gas manifold fitting or conduit 120 which is connected to the inert gas supply line 122 on the inside, and which delivers that gas forwardly at the forward facing outlet or shielding gas port. Cover plate 118 also provides the seat for a guide bearing and gas seal 124 that seat about the outside of the radially outwardly facing external shoulder of head 88.

A gas shield 126 is mounted on the outside or forward face of cover plate 118. Gas shield 126 has a broad or somewhat bulbous of bell-shaped cowling 128 that has a large end that mounts about gas seal 124, and a smaller forward end that carries a tip member 130. Tip member 130 has the form of a ceramic tube such as may be suitable for exposure to high temperature materials, e.g., splatter from ESD welding. When gas shield 126 is in place, shielding gas conveyed by line 122 is carried through plate 118 and discharged into the shielded chamber or duct, or passageway, or curtain, defined within cowling 128 and tip member 130, thereby to bathe the electrode in inert shielding gas.

At the connected end, housing 30 has three input connections, the third input being an inert gas supply line 122. The first input is an electrode power connection, which may be an AC or DC power connection, indicated as 132, and which may, ultimately, be connected to an ESD power source—the same power source of which the opposite pole is connected to the work piece upon which electrode 24 is to be applied. The power source may be indicated generically as a power supply, discussed below. The second input is a motor power source 134 for operation of electric motors 64 and 100 within housing 30, in the form of a power cable which may be 120V AC 60 Hz, or 220 V AC 50 Hz, or a 12V DC source, or such other source as may be, and could be a pneumatic source. In the embodiment shown, it may be a 24 V DC source, and motor 64 may be a 24 V DC Pittman variable speed motor having forward and reverse directions controllable by the On-Off switch. Motor 64 may be termed a low speed brush DC motor. It may have an operating speed range of 0 to 1800 r.p.m. In one application it has a rotational speed of about 300 r.p.m., which would generally be considered a relatively slow speed. Motor 100 may be an high speed DC or variable frequency AC, variable speed servo motor. Ability to adjust both the speed and the imbalance of the eccentric may permit the operator to choose a setting suited to the materials to be welded and to be applied. It may have an operating speed range up to 3000 r.p.m., and may typically be run in the range of 500 to 1500 r.p.m. About 1000 r.p.m. is a speed that has been used.

Figure 8A:
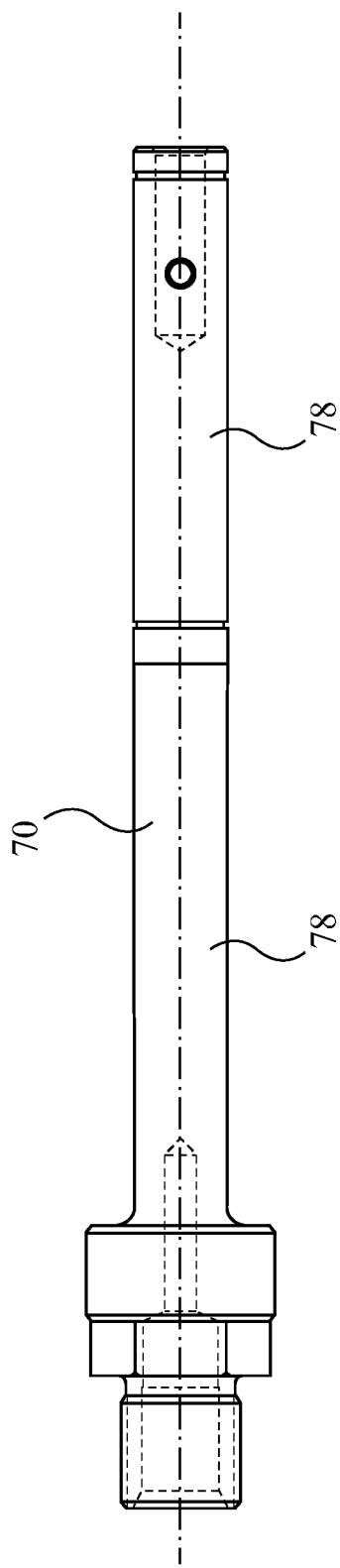
FIG. 8a shows a first embodiment of rotating shaft for the assembly of FIG. 7.
Figure 8B:
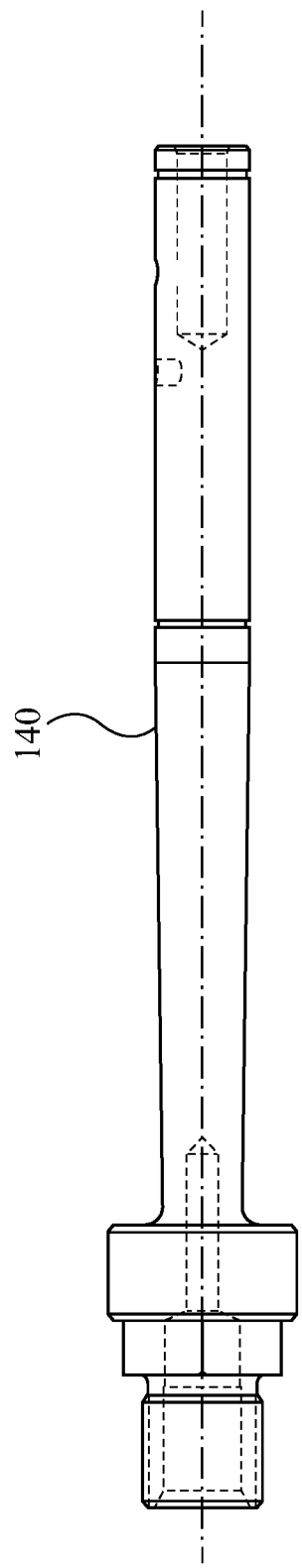
FIG. 8b sows a second embodiment of rotating shaft for the assembly of FIG. 7.

FIGS. 8a and 8b show alternate embodiments of main shaft 70. In FIG. 8a, main shaft 70 is substantially cylindrical from coupling 68 to the rearward face of the shoulder of head 88. By contrast, in the alternate embodiment of FIG. 8b, main shaft 140 is tapered to narrow in section longitudinally forward of the mid-pint bearing, thus making shaft 140 somewhat less stiff than shaft 70.

The main power cable, namely that of electrode power connection 132, is secured at a terminal lug inside housing 30. The shielding gas conduit 122 may have the form of a hollow pipe that is formed to run along the inside proximal margin of housing 30. Coolant conduit 122 may be used to conduct an inert gas, such as argon, to electrode rod 24, and may be used for the alternate purpose of providing an inert gas shielding to the coating process. Conduit 122 may be made of a non-electrically conductive material such as a plastic tube. That portion of conduit 122 lying within housing 30 may be made of a metal, such as copper, aluminum, stainless steel, mild steel, or such other metal as may be suitable.

As noted, also enclosed within housing 30 is a vibration assembly, or an oscillator, or shaker, or motion exciter, namely assembly 62. The resultant vibration has an amplitude having a component in the transverse direction of electrode rod 24. In use, an operator grasps housing 32, and uses electrode 24 much like a pencil to paint or coat the workpiece object—provided one is accustomed to painting or writing while the pencil is oscillating. Of course, the pencil has two degrees of motion imposed upon it, namely rotation about the axis of the rod (by motor 64) and transverse deflection (by motor 100 and eccentric weight 118). The rotation of eccentric 118 causes apparatus 20 to vibrate, which, in turn, causes electrode 24 rapidly and repeatedly to make and break contact with the work piece. With each oscillation there is a new spark and deposition of the material of electrode rod 24 onto the workpiece.

Vibration assembly 62 provides a forcing function input to the drive transmission of rod 26, namely assembly 100, transmitting an input impulse, or wave-train of impulses. The force and displacement transmissibility of that transmission of the mechanical motion of the forcing function input to electrode 24 is dependent upon the natural frequency of the vibrational degree of freedom of interest. Although the axis of the cylindrical rod of electrode 24 is shown as being parallel to the long axis of apparatus 20, this need not necessarily be so. In another embodiment, electrode 24 may have the form of a rod having an axis at least partially transverse to the main body of housing 30.

The apparatus shown and described herein may be employed for processes that may be termed "Low Energy Welding". That is, where there may be 1 kJ of energy used in the heating of a resistance spot weld, in an intermittent electrical discharge weld, the amount of energy used in heating at each contact of the electrode to the workpiece may be of the order of 1 Joule. The heating has very short time duration, is highly localised, and results in the deposition of only a very small amount of material. While the welding is true welding in terms of the fusion of materials through melting, the small energy input may tend to reduce or substantially eliminate any heat affected zone.

The handle apparatus drives the consumable electrode 24 to vibrate in a first degree of freedom of motion relative to the metallic surface being coated or treated in the process. The force or displacement is generated by attaching an eccentric circular metal load to a spinning motor. The positioning of the eccentric weight determines the pounding or contact force when the contacts are made. The frequency of vibration is controlled with the speed of the motor to which the eccentric weight is mounted. The longitudinal movement of the consumable electrode in a direction that includes a component of motion, and usually a predominant component of motion, normal to the surface to be treated, allows the periodic contacts to be made with the metallic surface of the workpiece. This occurs while that workpiece surface is being driven in a second degree of freedom of motion. The combination of motions, and the vibration-driven urge to make and break contact, may result in a relatively stable or consistent sequence of electro-sparks (when the contacts open) and depositions of coating material (when the open contacts approach) that take place in the process. The vibrating motion is, or may include, motion normal to the surface being coated.

It is known to use an ultrasonic horn to impose vibration on a welding rod. Here, however, an apparatus is provided that may provide secondary vibration (i.e., the first or primary motion forcing function is rotation about the axis, caused by motor 64; the second forcing function is due to motor 100 and eccentric 118), without using an ultrasonic vibration source. A variable speed motor and weight combination may tend to be a relatively low cost and robust approach to this issue.

Figure 4:
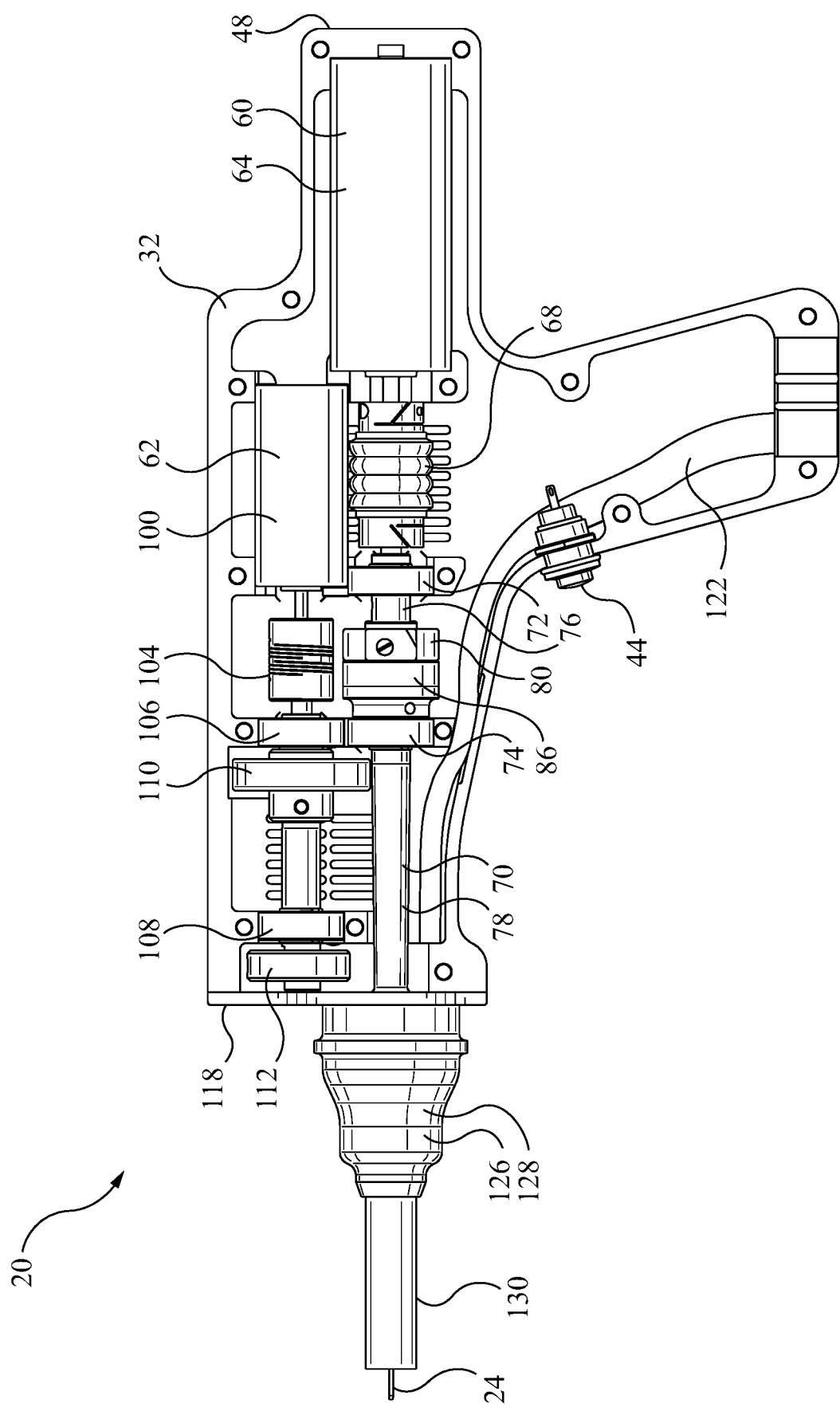
FIG. 4 is a left-hand side view of the apparatus of FIG. 1 with near-side exterior shell removed to reveal internal details.
Figure 7:
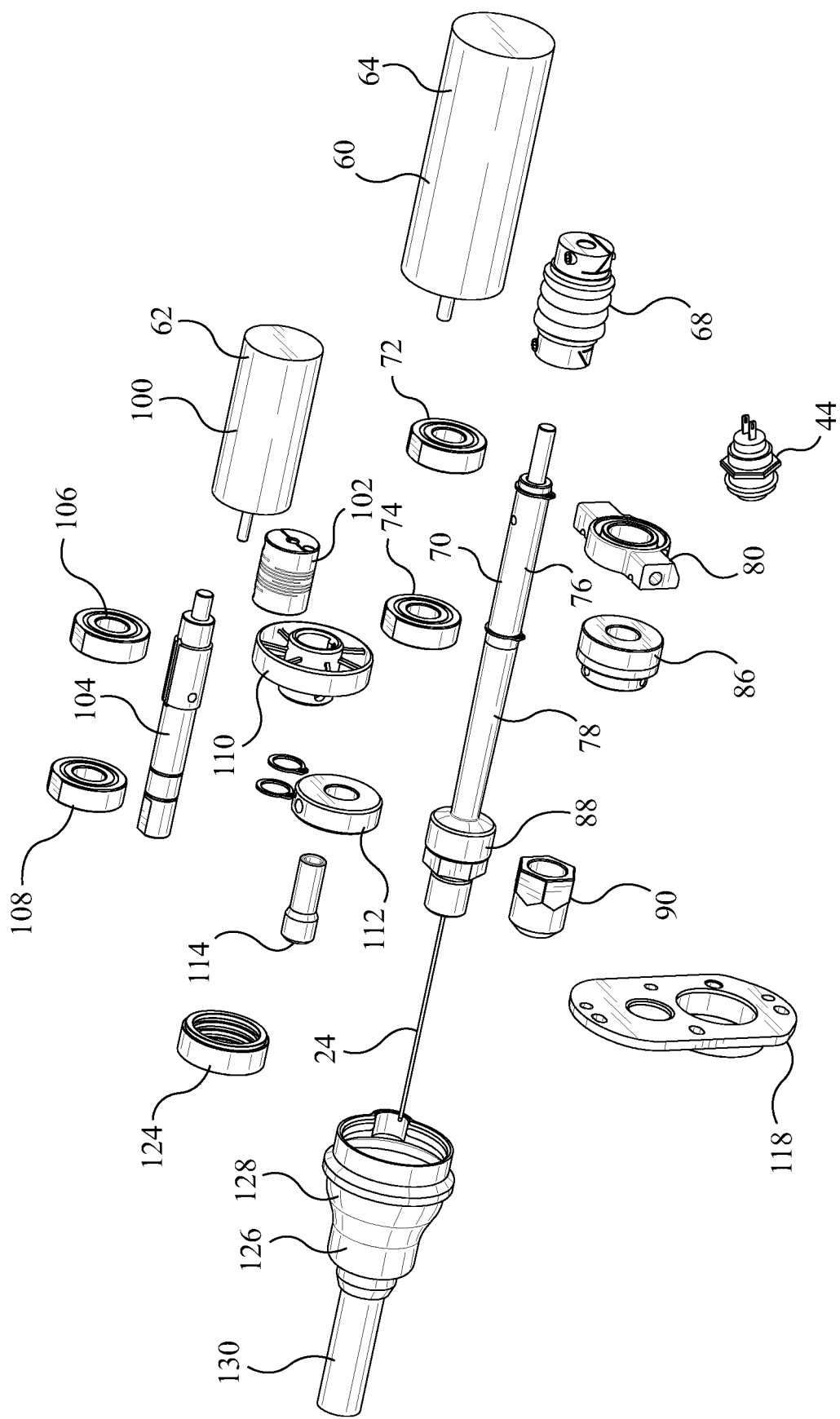
FIG. 7 shows an exploded view of the rotating elements of the apparatus of FIG. 1.
Figure 9A:
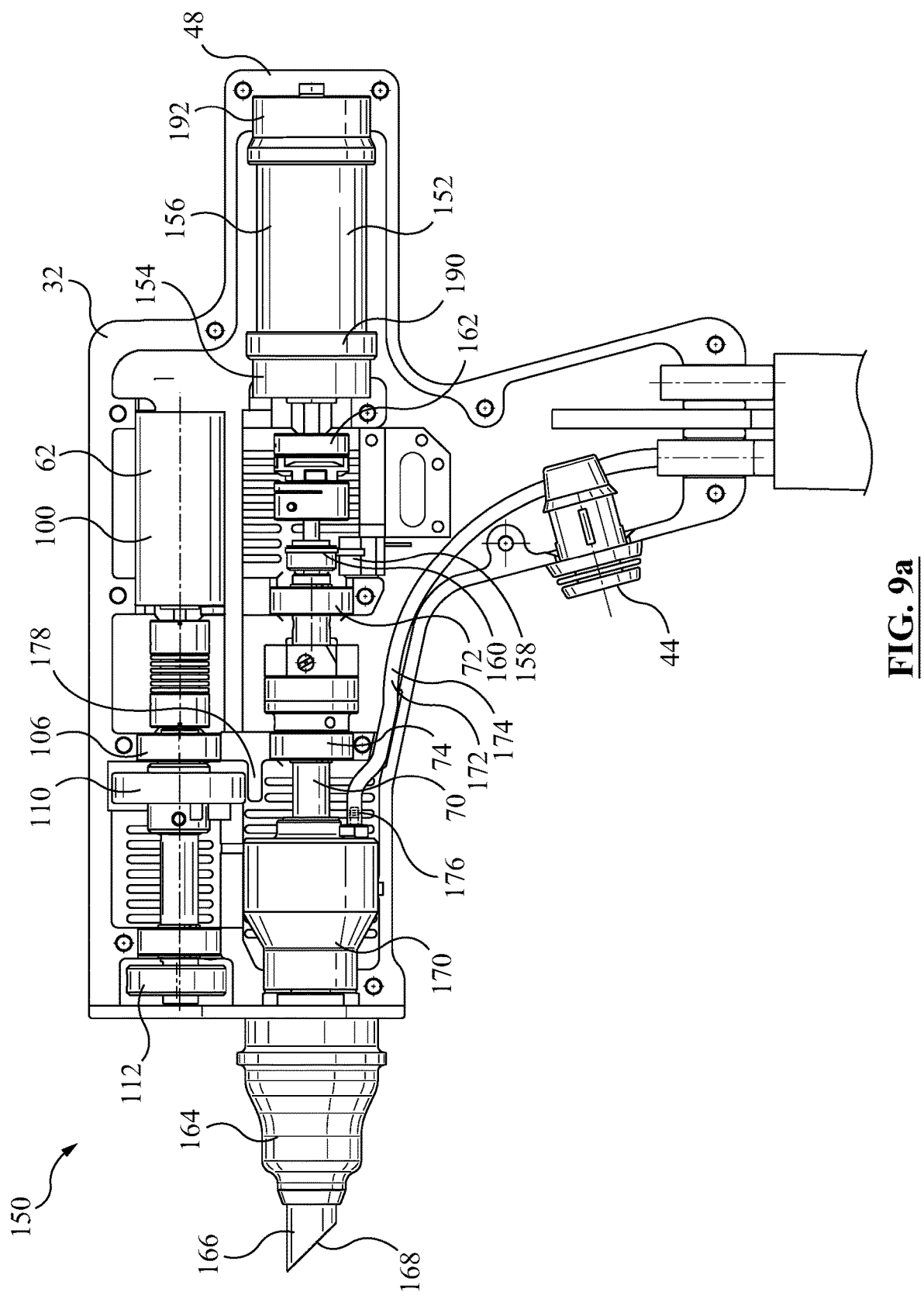
FIG. 9a shows a section of an alternate embodiment of welding apparatus to that of FIG. 4, with near-side housing shell removed.
Figure 9B:
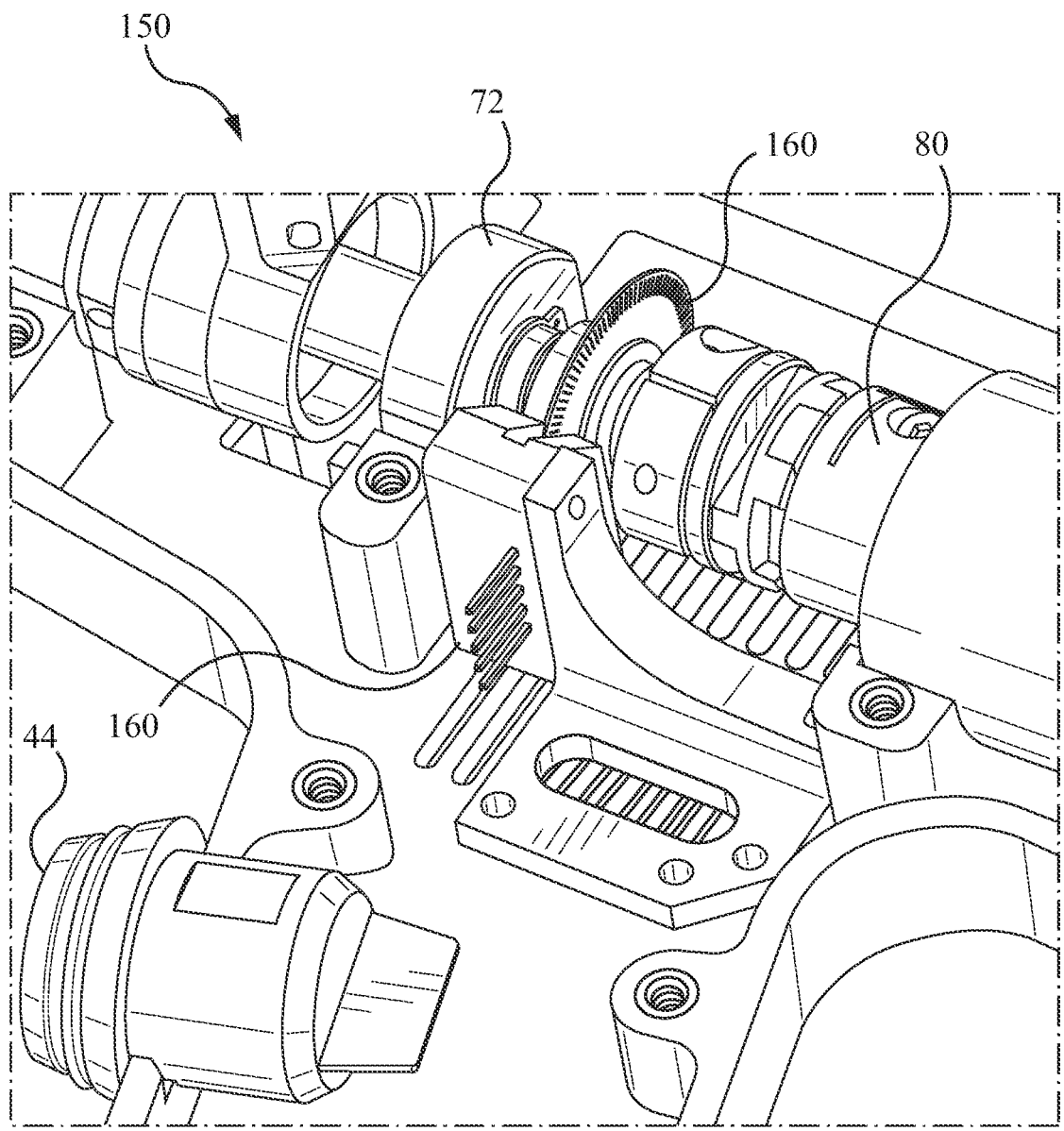

In the embodiment of FIGS. 9a and 9b there is a welding apparatus 150 that is substantially similar to that of FIG. 4. However, in addition to the features of apparatus 20, welding apparatus 150 has a first drive 152 that includes a speed reducer, in this case a gear reducer, 154, mounted at the front end of motor 156 to drop down the output rotational speed. Further, apparatus 150 includes a feedback control apparatus 158 that includes a digital encoder 160 mounted to observe shaft speed. Encoder 160 is mounted between coupling 162 and near end bearing 72. In this embodiment, it may be noted that the inert gas delivery cowling 164 gives onto an output duct or tube 166 that has a mitred end 168 rather than a square cut end.

By its nature, when the welding rod is depositing material on the object work surface the material to be deposited, at the tip of the welding rod, is heated to a molten state. The deposited material cools rapidly. There may be a tendency for the tip of the rod to stick and jump. This tendency may tend also to cause variation in the rotational output speed of the welding rod between a substantially instantaneous high load condition and a substantially instantaneous no-load condition. The use of a feedback function may permit the variation of rotational speed to tend to be reduced. The frequency of the digital sensor and encoder is of the order of mHz. The frequency of rotation of the rod may be of the order of 300 rpm, i.e., 5 Hz.

In another feature, liquid cooling is provided to electrode holder 22, in the form of a liquid cooling jacket 170, supplied from supply and return lines 172, 174 attached at corresponding supply and return fittings 176. The provision of a liquid coolant system in this way may permit more consistent control of electrode rod temperature during operation.

In this embodiment, apparatus 150 may also include an impeller 110. The housing has a shroud 178 to discourage output air from impeller 110 from recirculating back into the input, such that flow may start by being drawn in at the vents or ports in the housing on one side of the impeller and be pushed out the vents or ports on the other side.

Figure 10A:
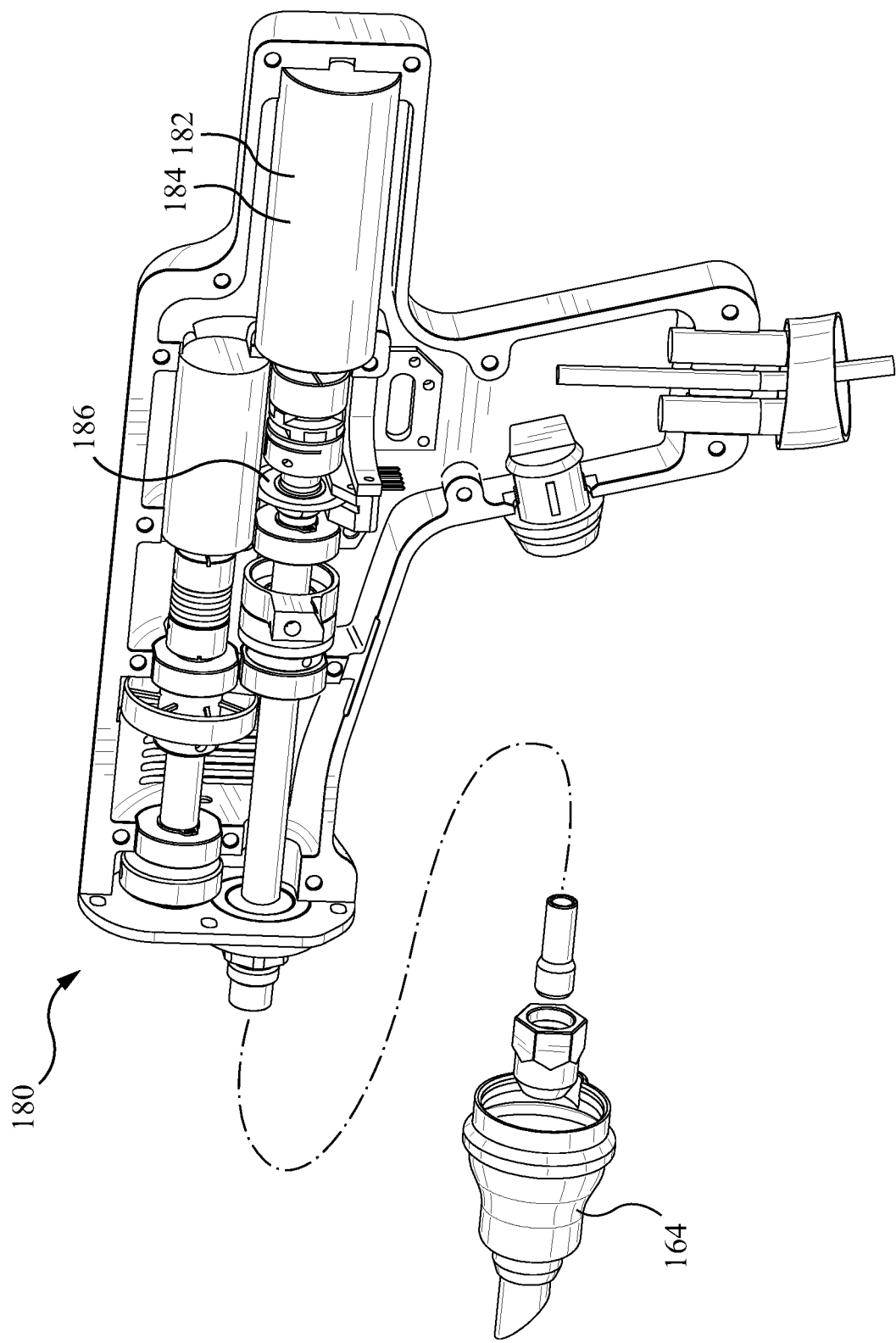
FIG. 10a is a perspective view of a further alternative embodiment of welding apparatus to that of FIG. 9a, with near-side half-shell cover removed.
Figure 10B:
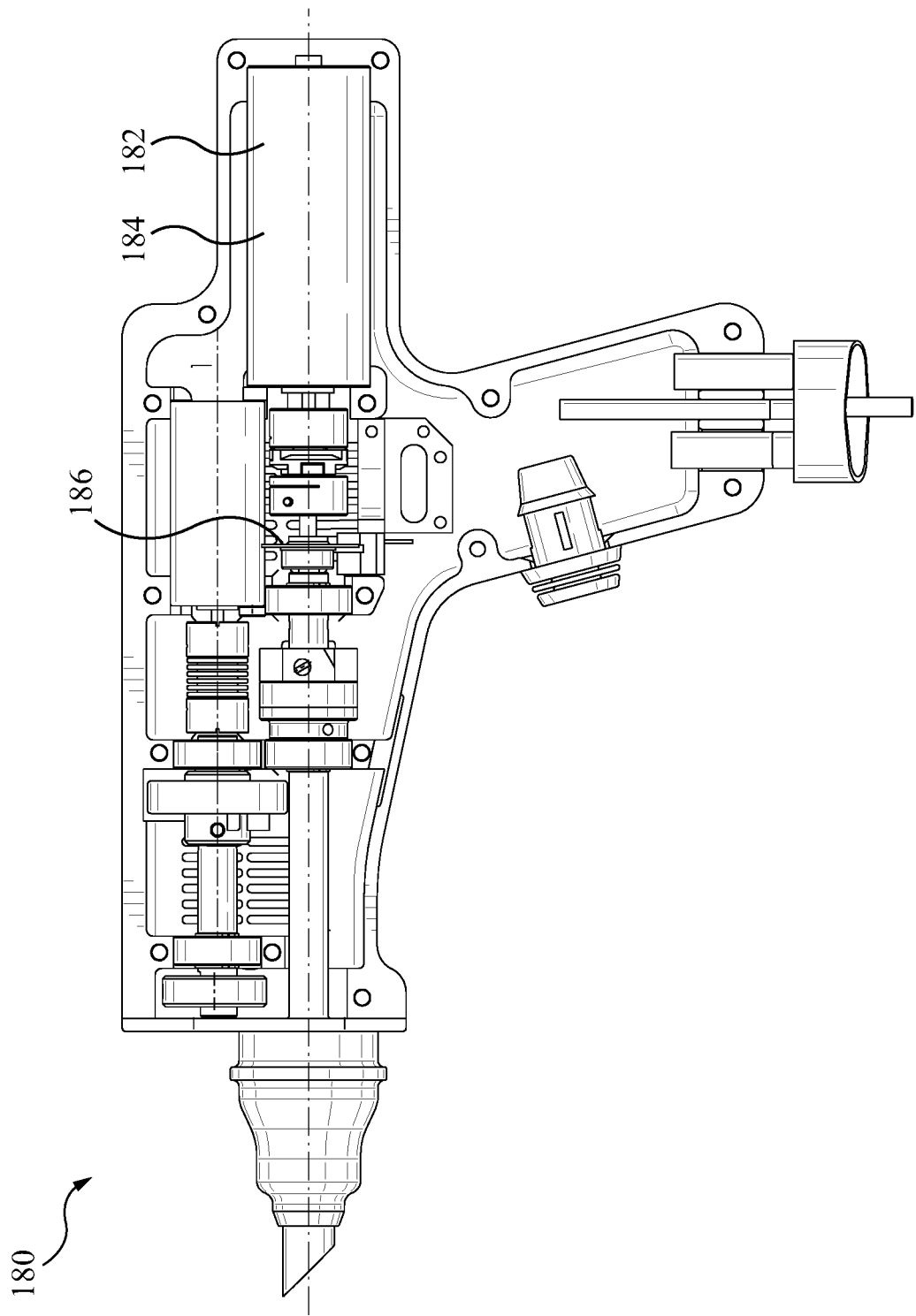

Some embodiments may not have all of the features of FIGS. 9a and 9b. By way of example, in FIGS. 10a and 10b, welding apparatus 180 is substantially the same as, or similar to, welding apparatus 150, except that it does not employ a liquid cooling manifold, or liquid cooling jacket, and the motor 184 of the first drive 182 does not have a gear reducer. It does, however, have an output shaft speed feedback control system that includes a digital encoder as at 186 that is used to govern the variable speed motor 184.

Figure 11A:
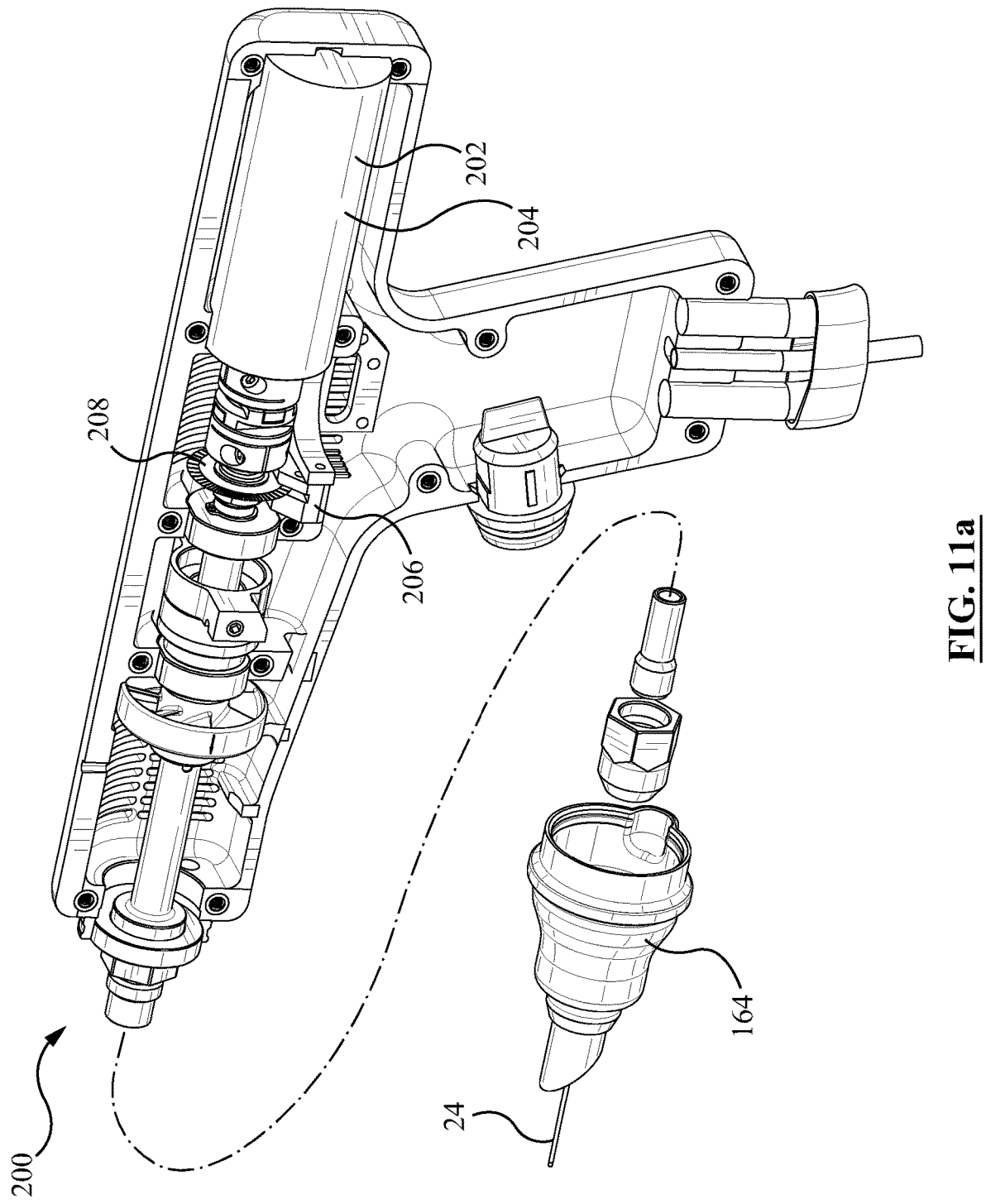
Figure 11B:
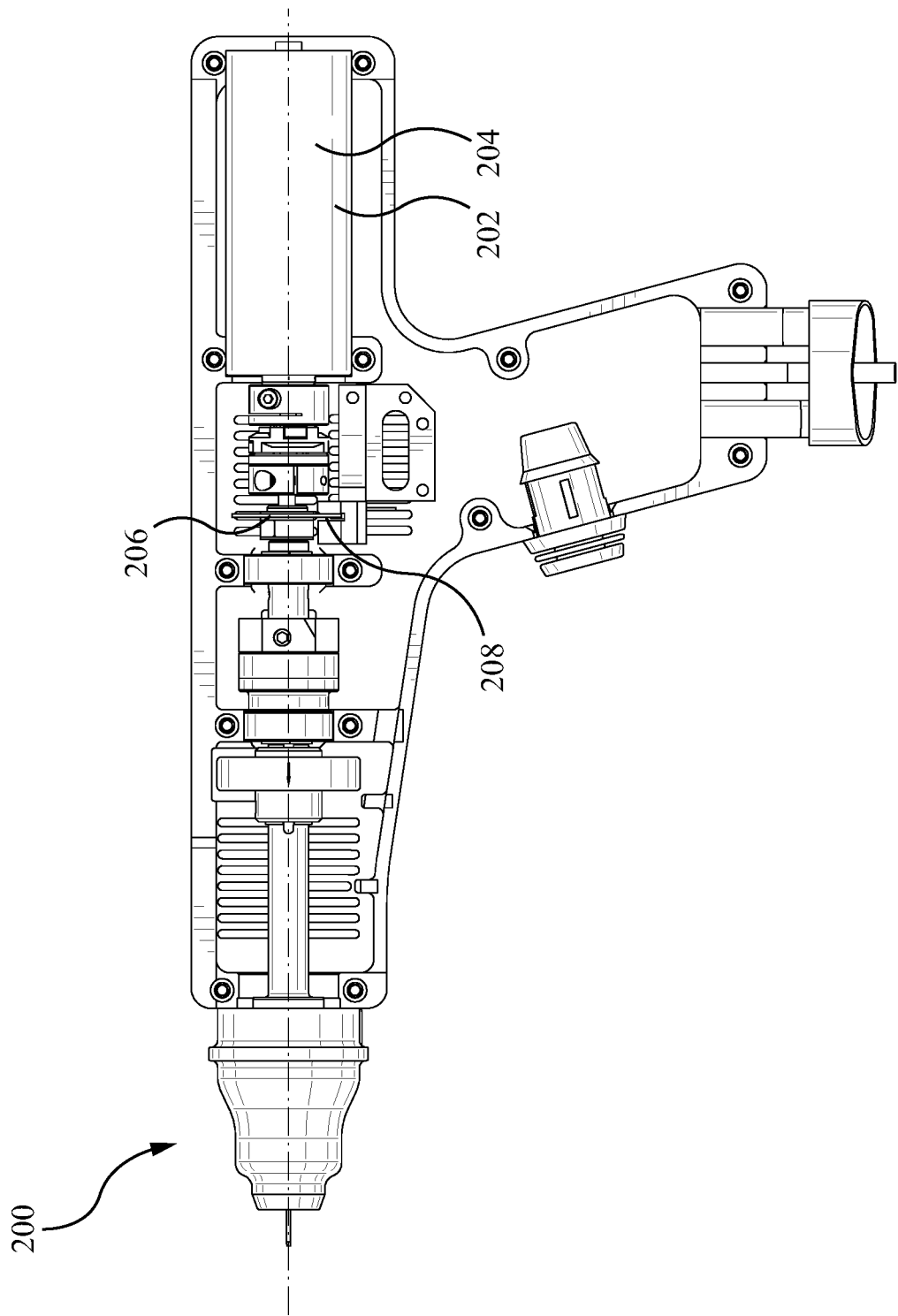
Figure 12A:
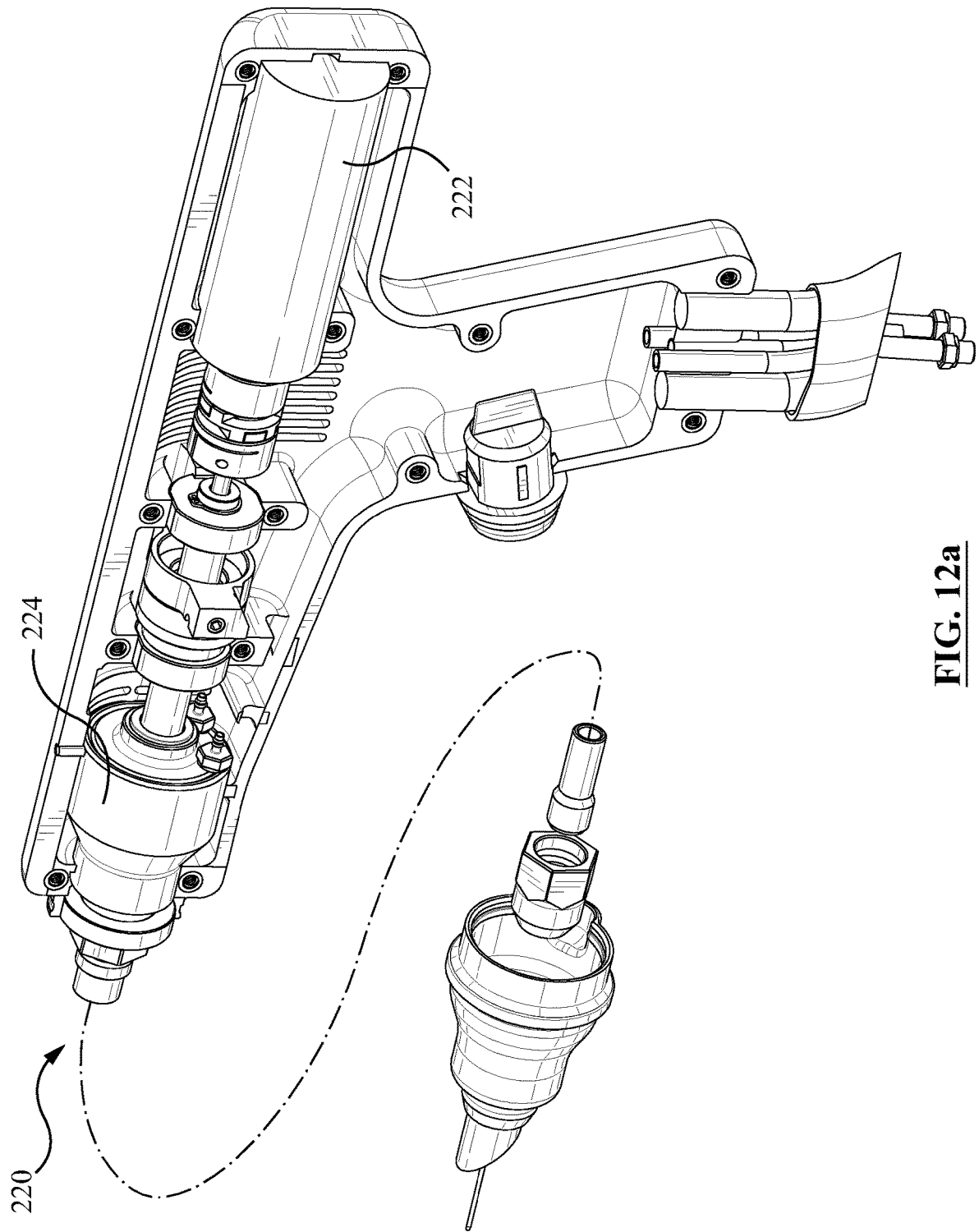
Figure 12B:
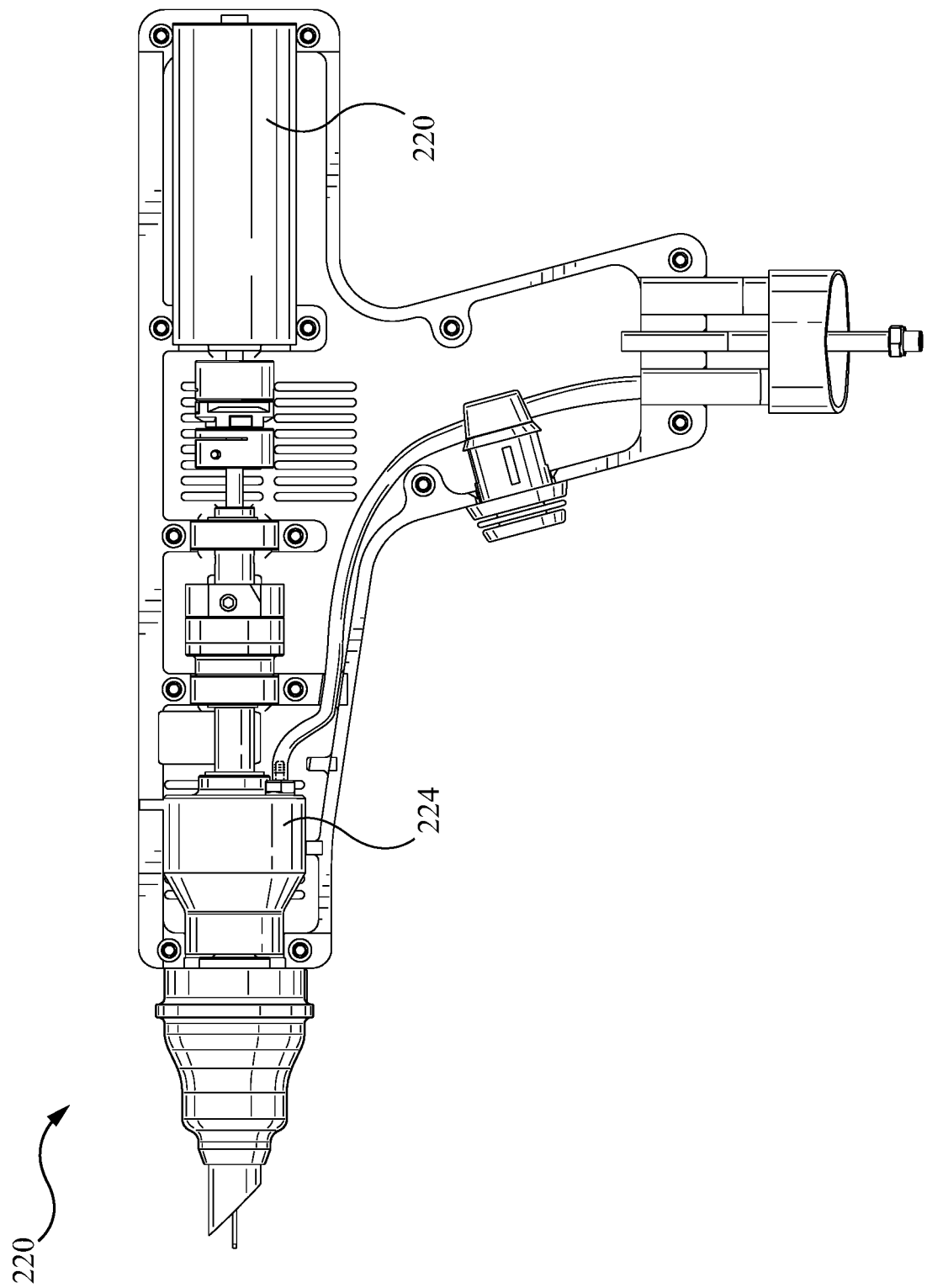
Figure 13A:
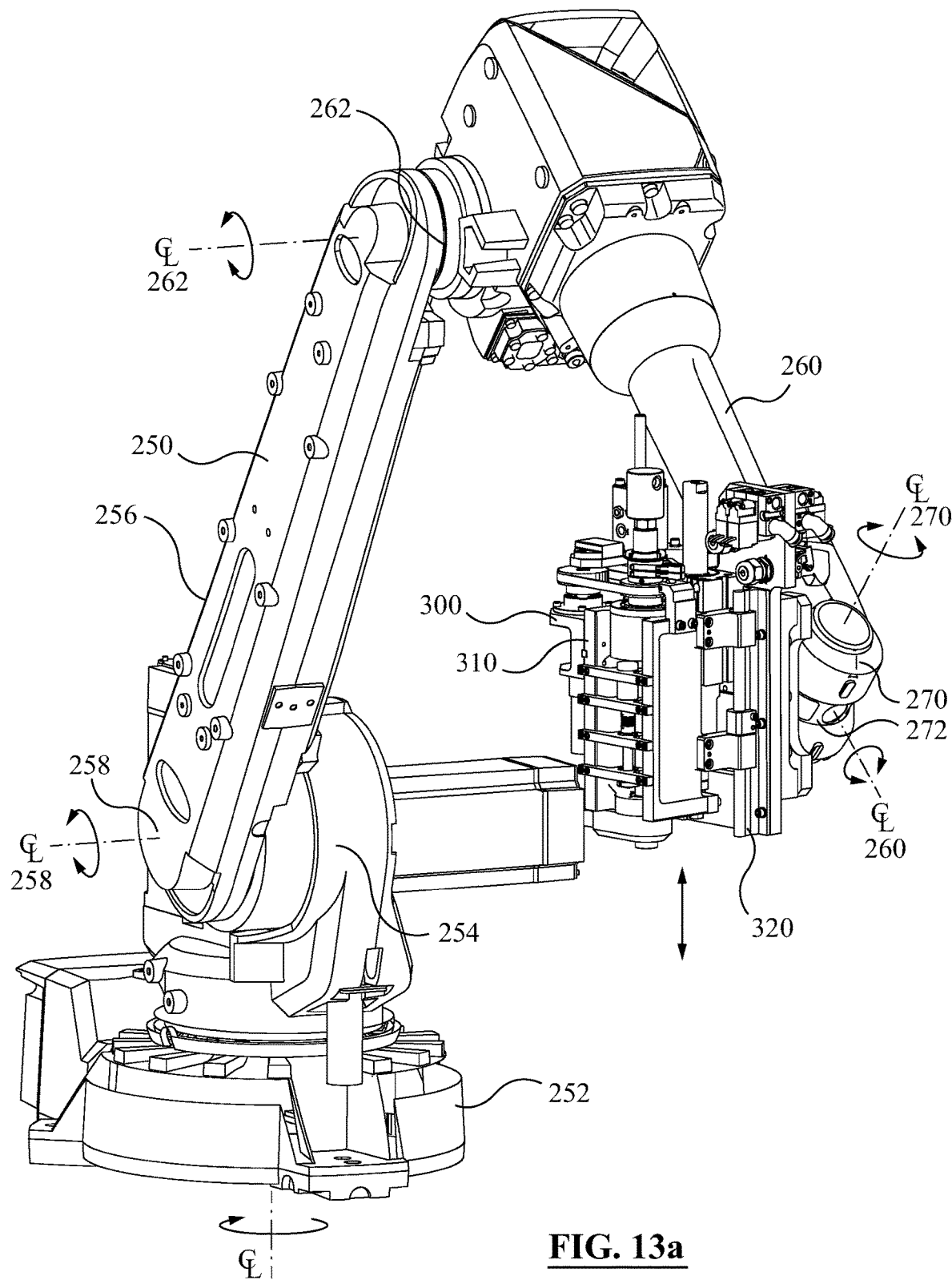
FIG. 13a shows a perspective view of an alternate embodiment of coating apparatus to that of FIG. 1a mounted on a multi-axis robot.
Figure 13B:
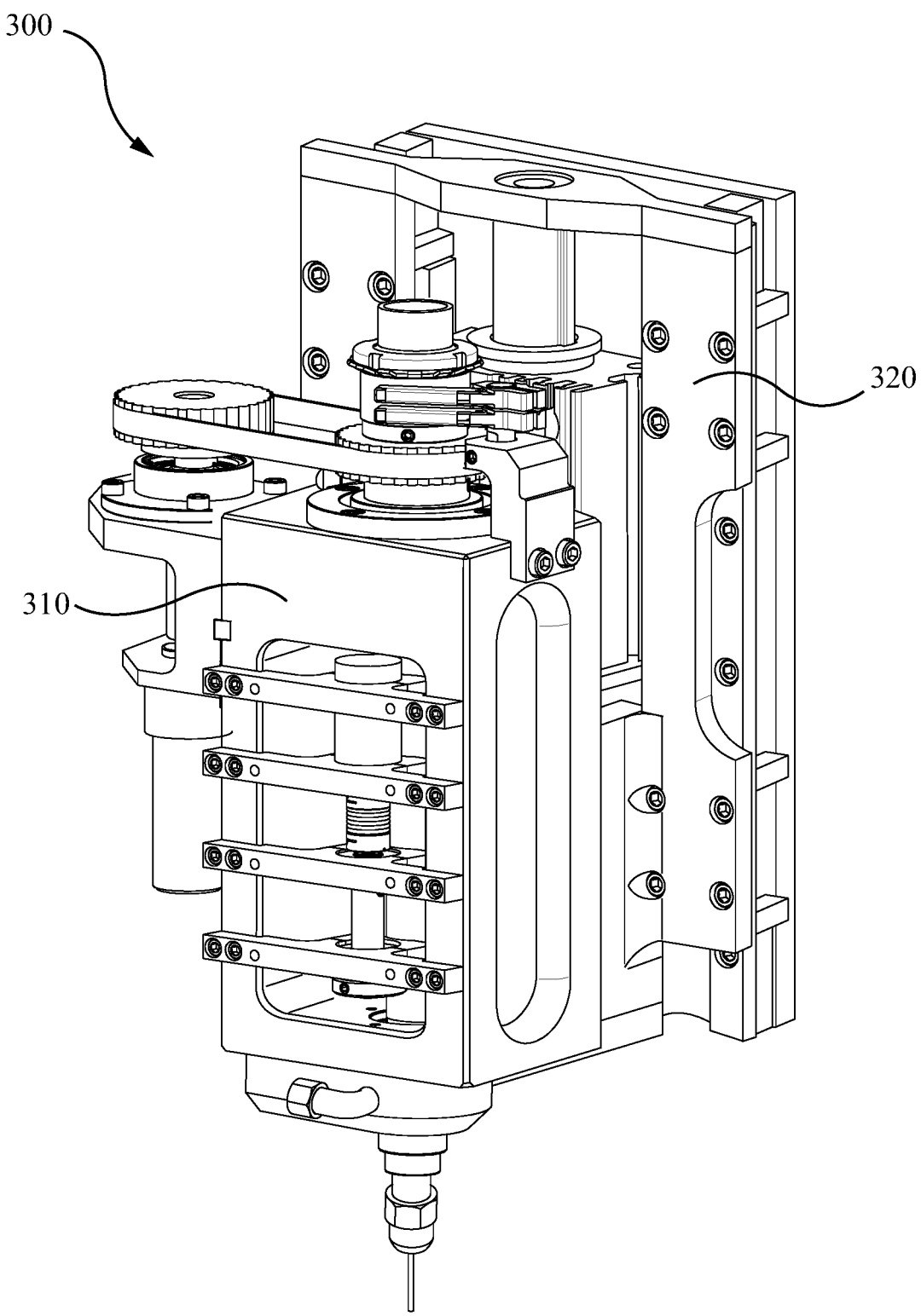
FIG. 13b shows a perspective view of the alternate welding or coating apparatus of FIG. 13a, apart from the robot.
Figure 14A:
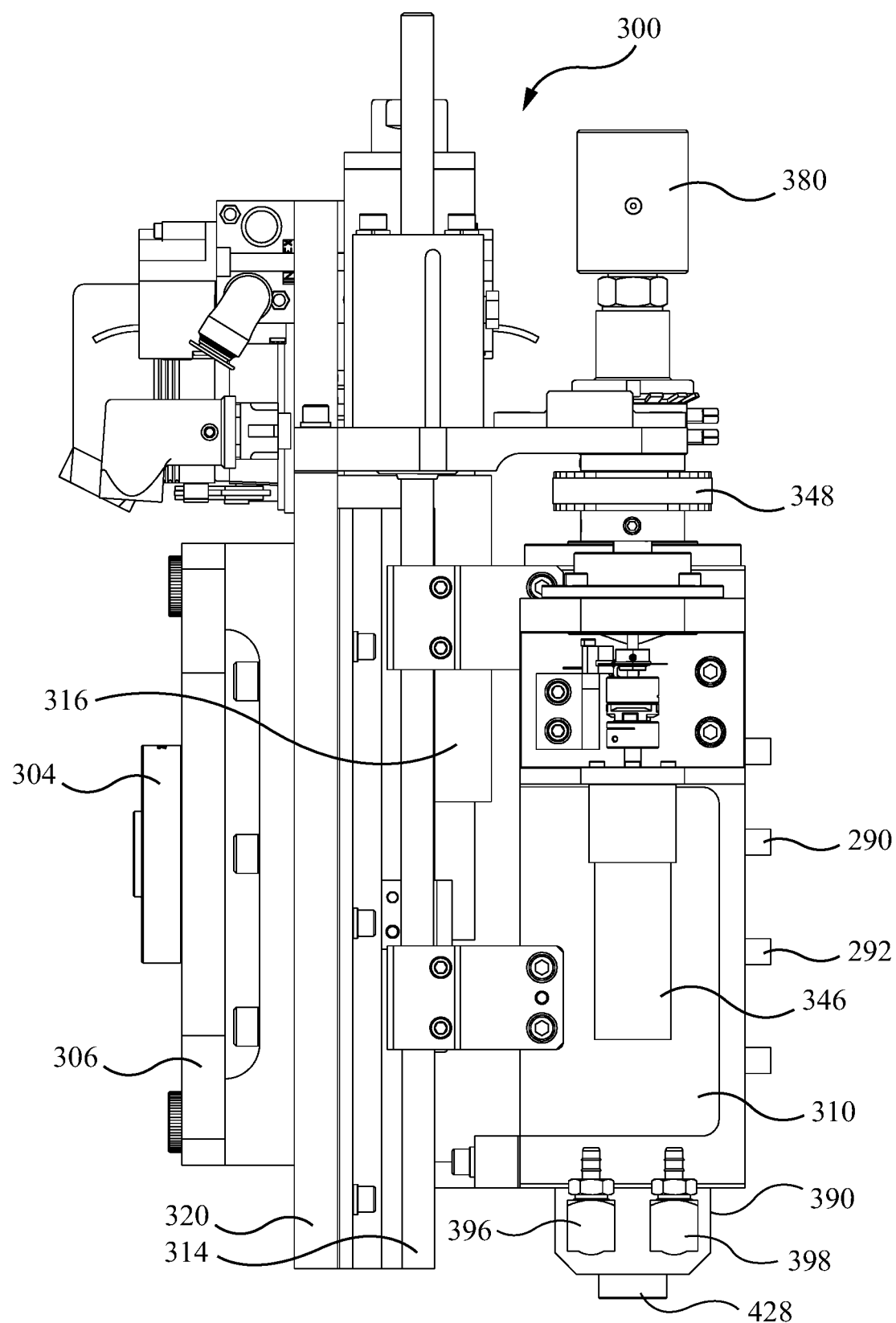
Figure 14B:
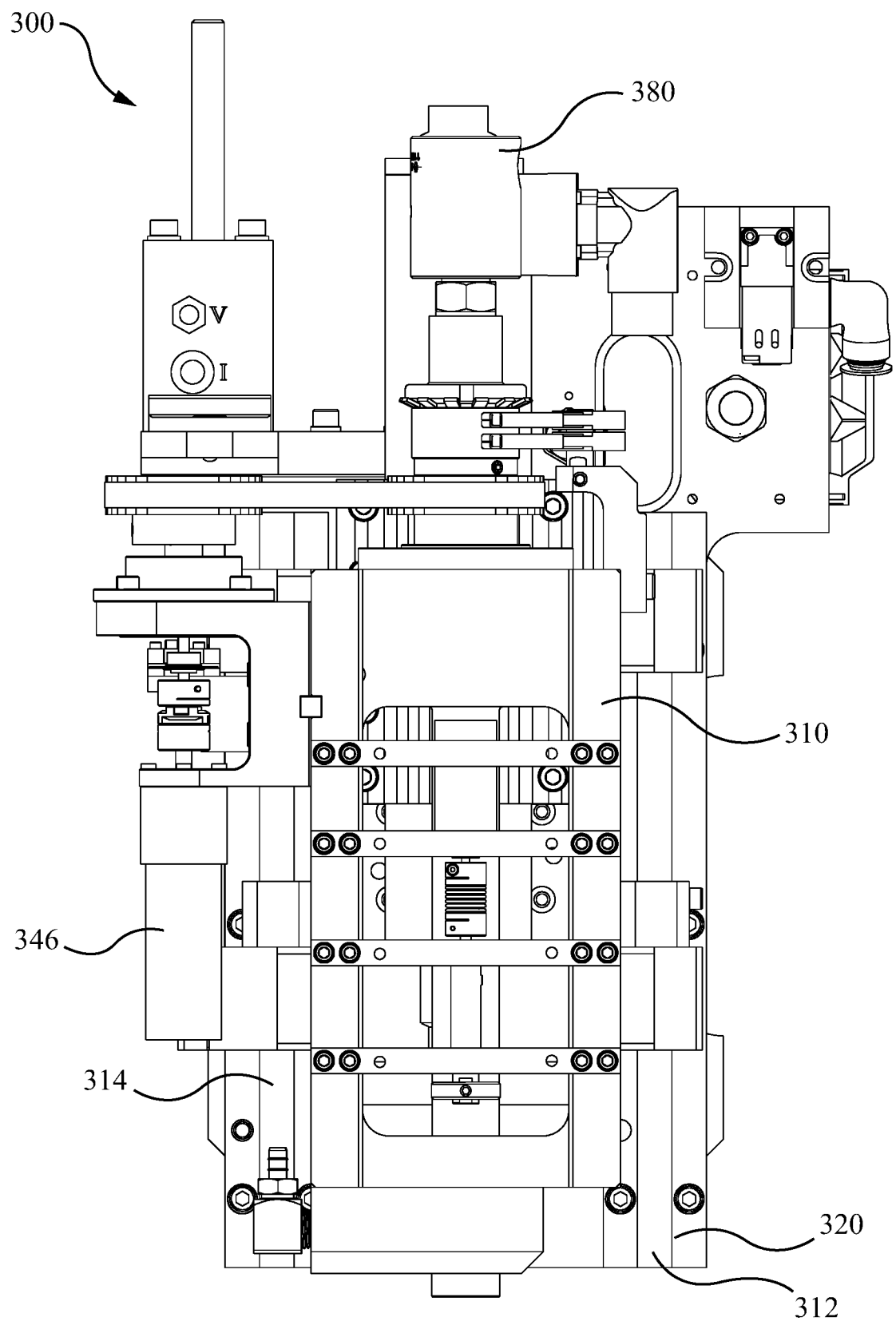
Figure 14C:
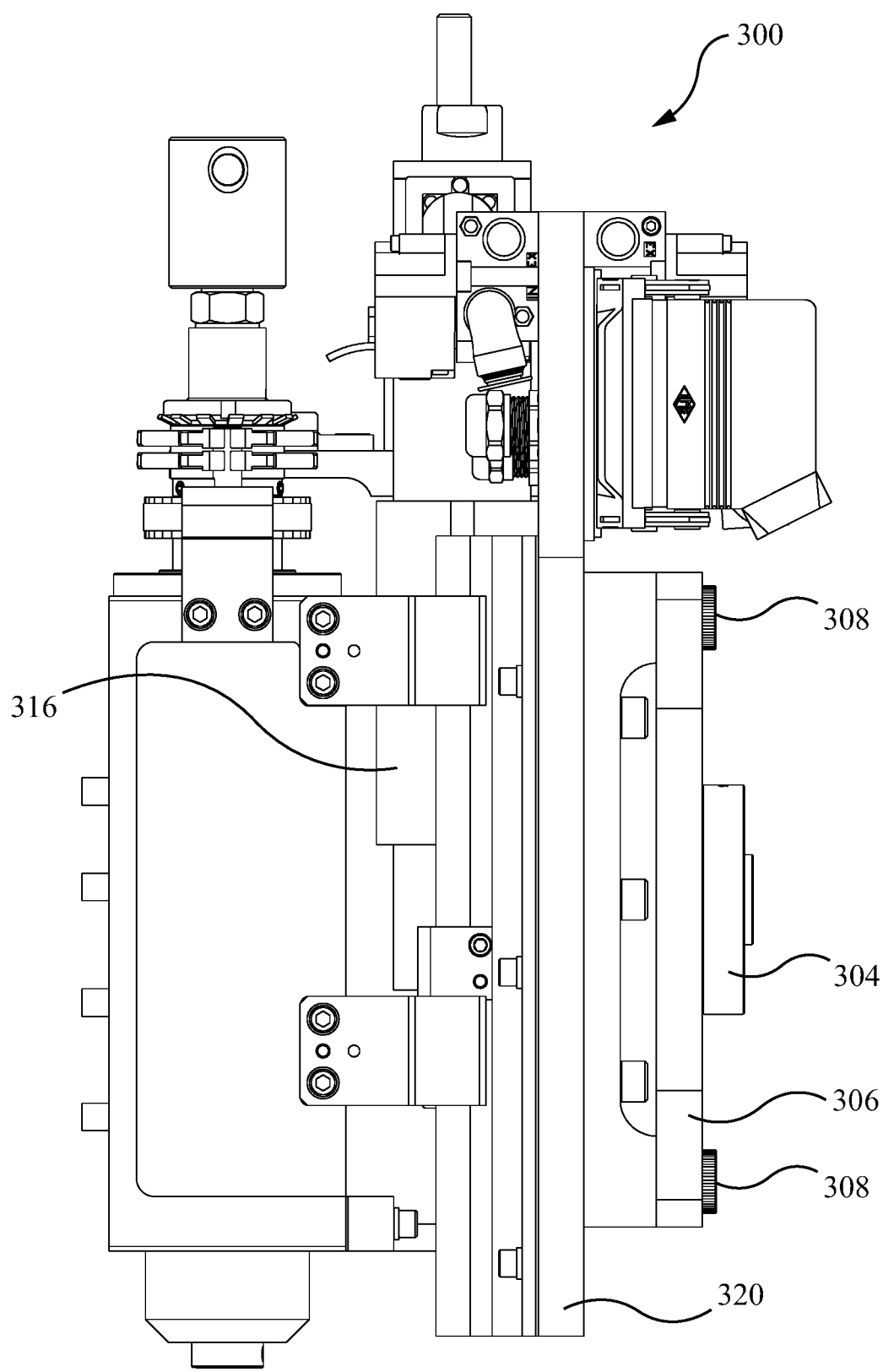
Figure 14D:
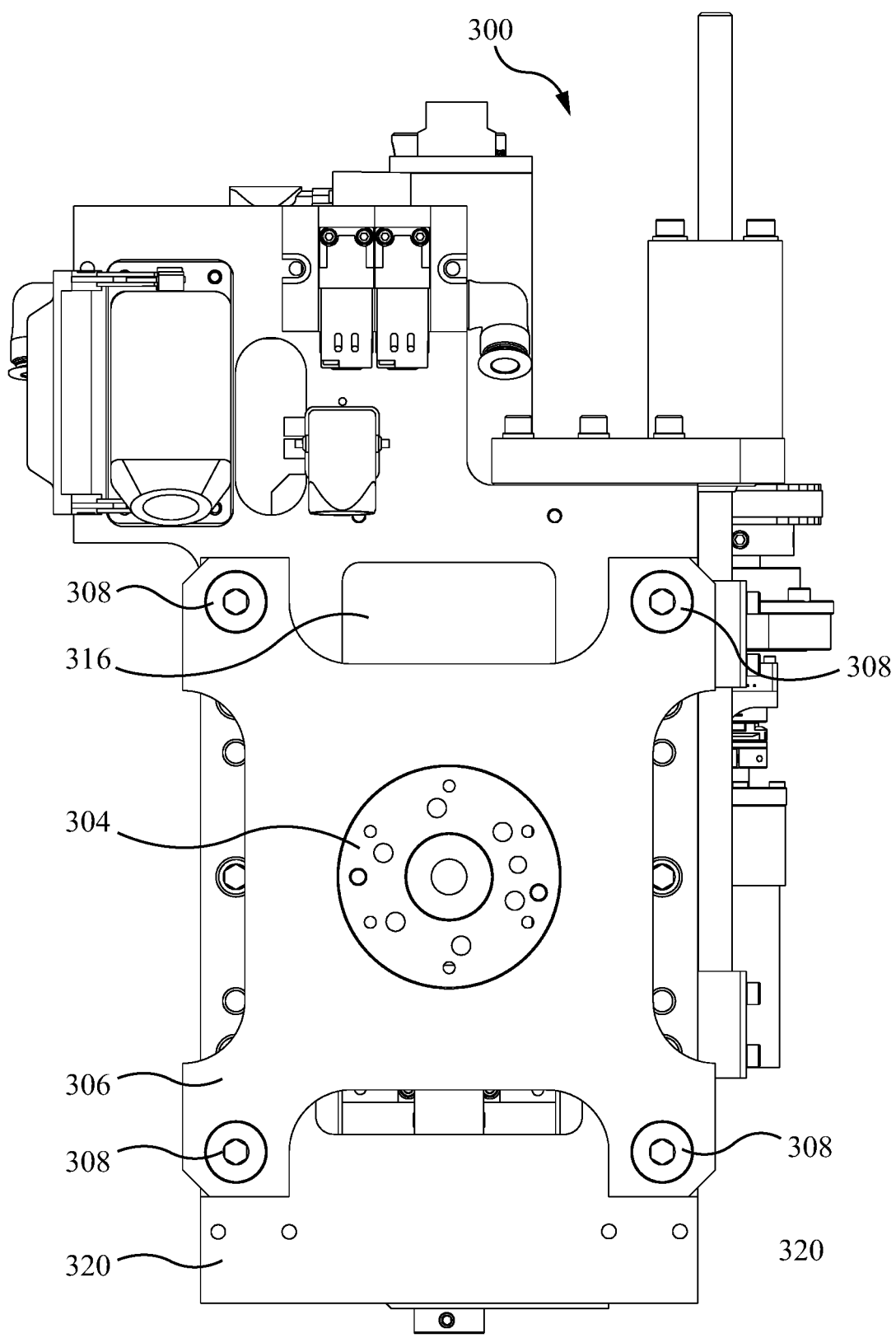
Figure 14E:
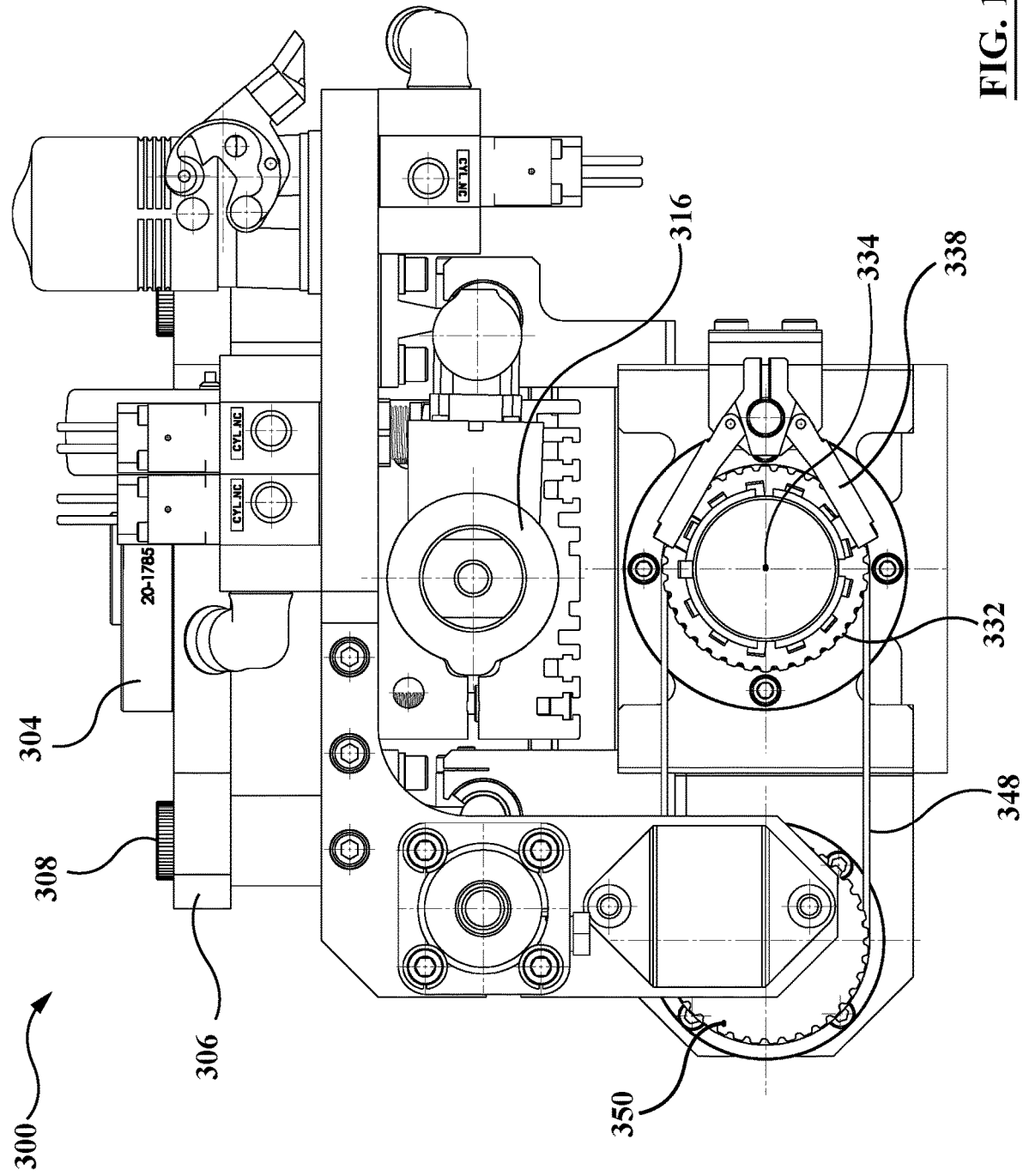
Figure 14F:
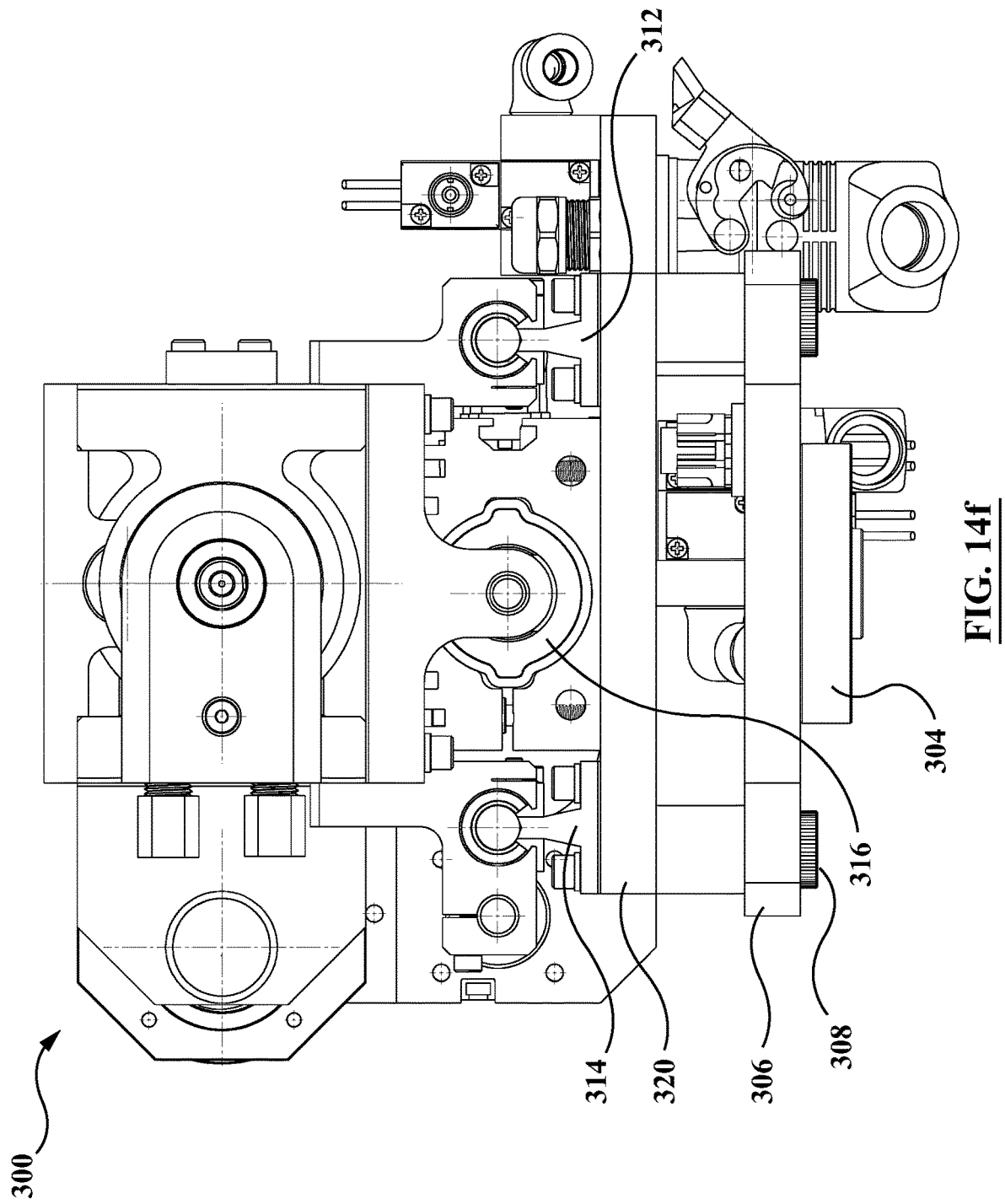
Figure 15A:
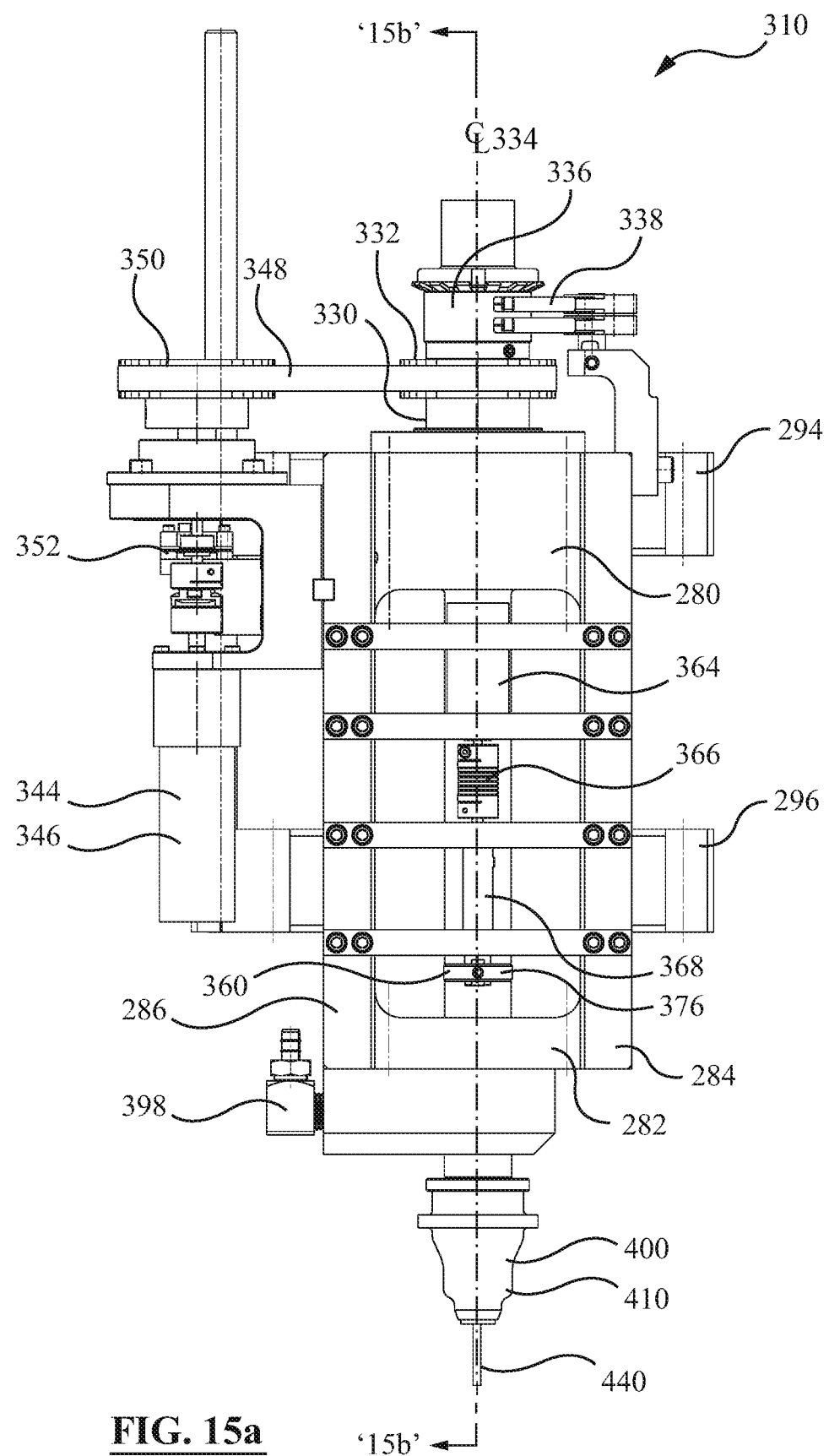
Figure 15B:
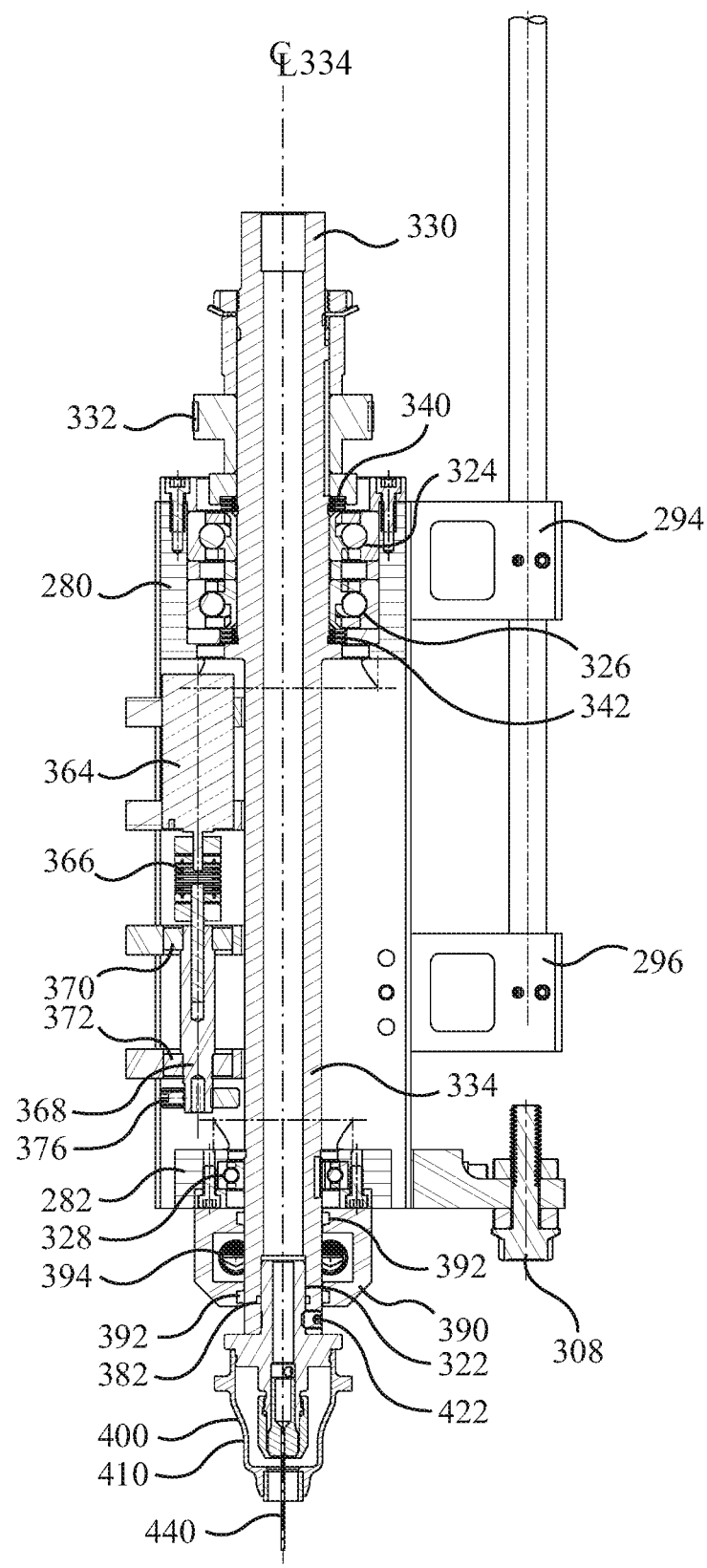
FIG. 15b shows a cross-sectional side view of the spindle housing of FIG. 15a taken on the center line vertical plane of the spindle.
Figure 16A:
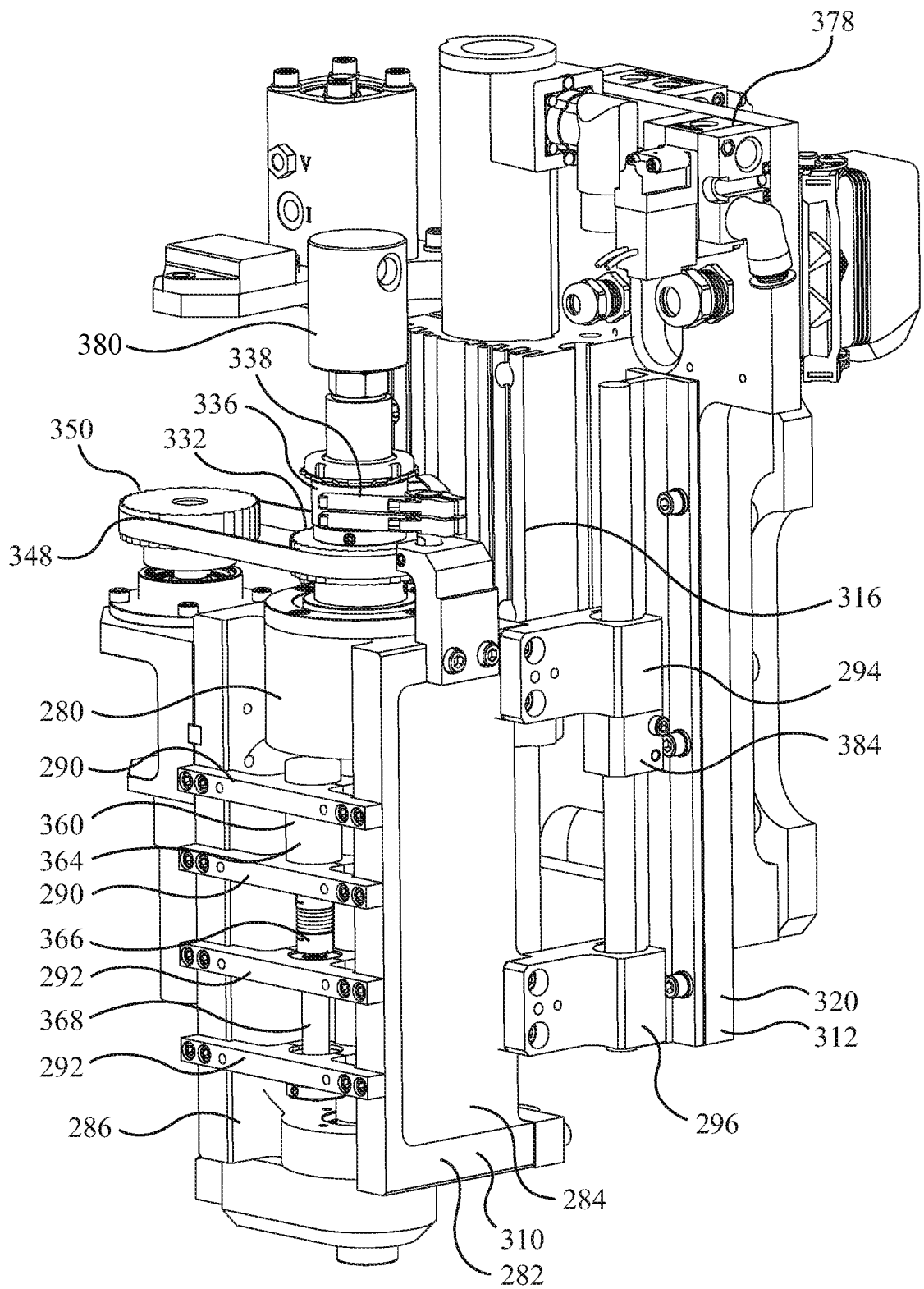
FIG. 16a shows a perspective view from the right front of the coating head of the coating apparatus of FIG. 14a, with the coating head in the fully extended or lowered position as when engaging a workpiece.
Figure 16B:
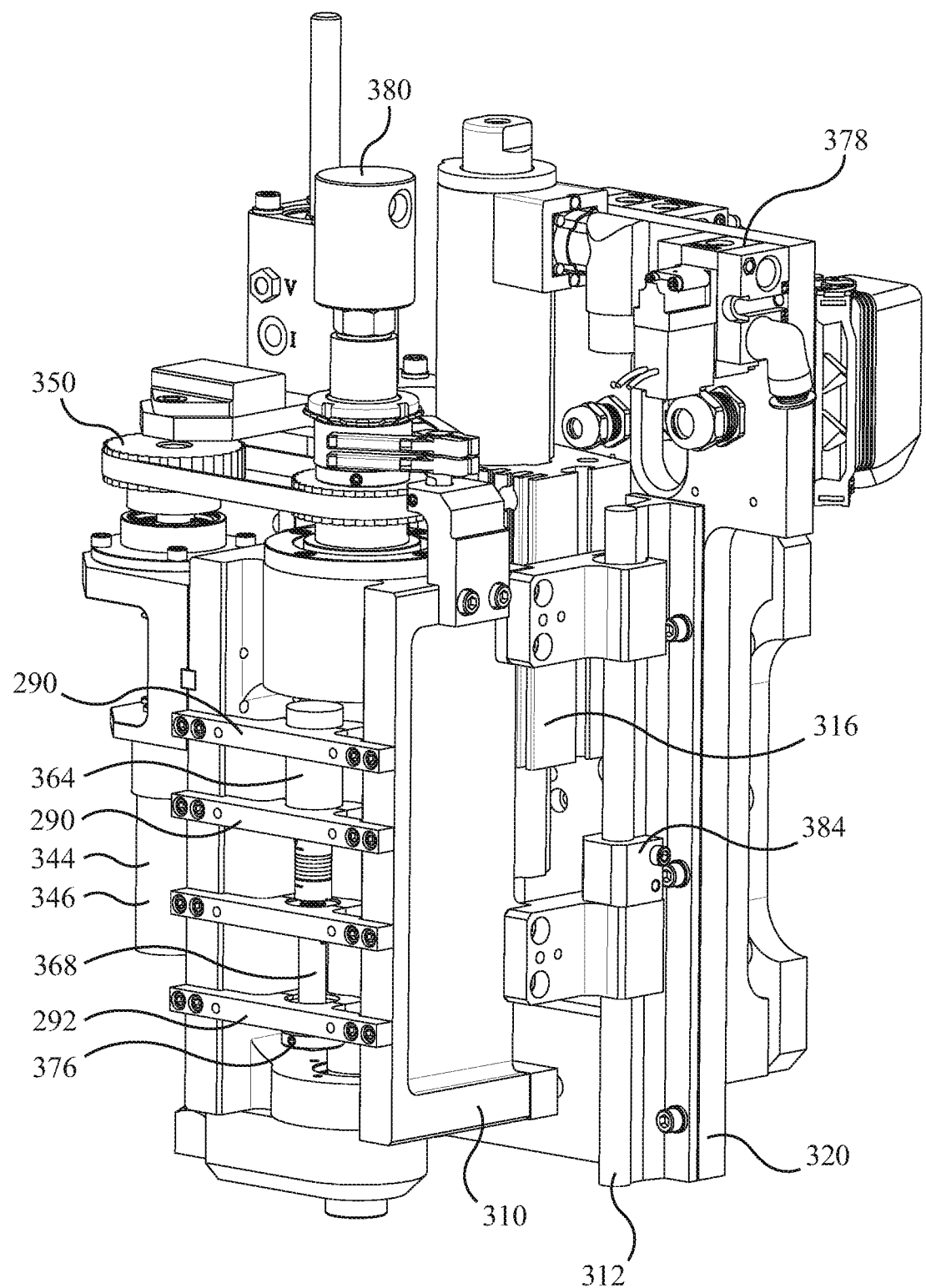
FIG. 16b shows a perspective view from the right front of the coating head of the coating apparatus of FIG. 14a in the raised or fully retracted position, as when disengaged from the workpiece'
Figure 16C:
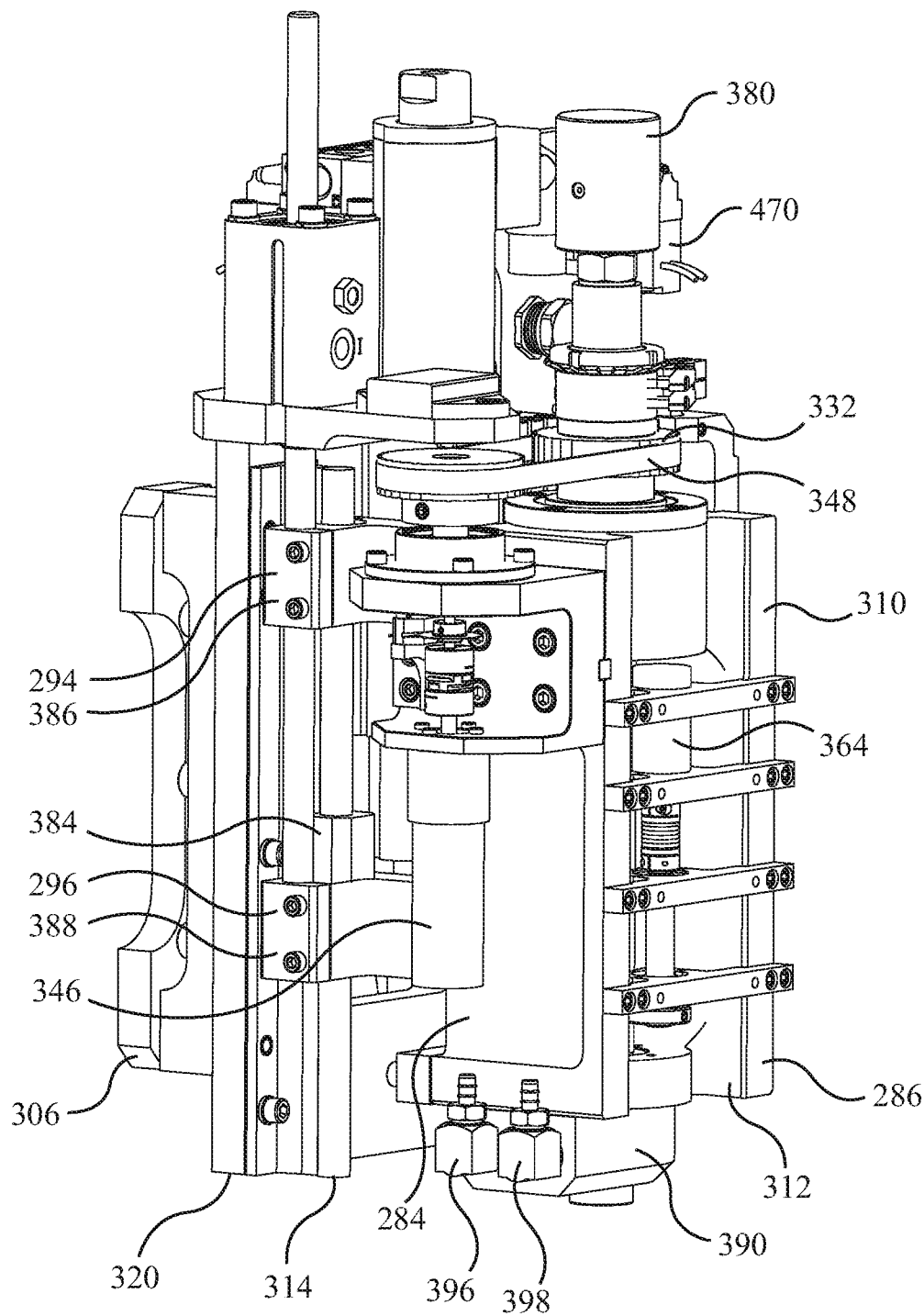
Figure 16D:
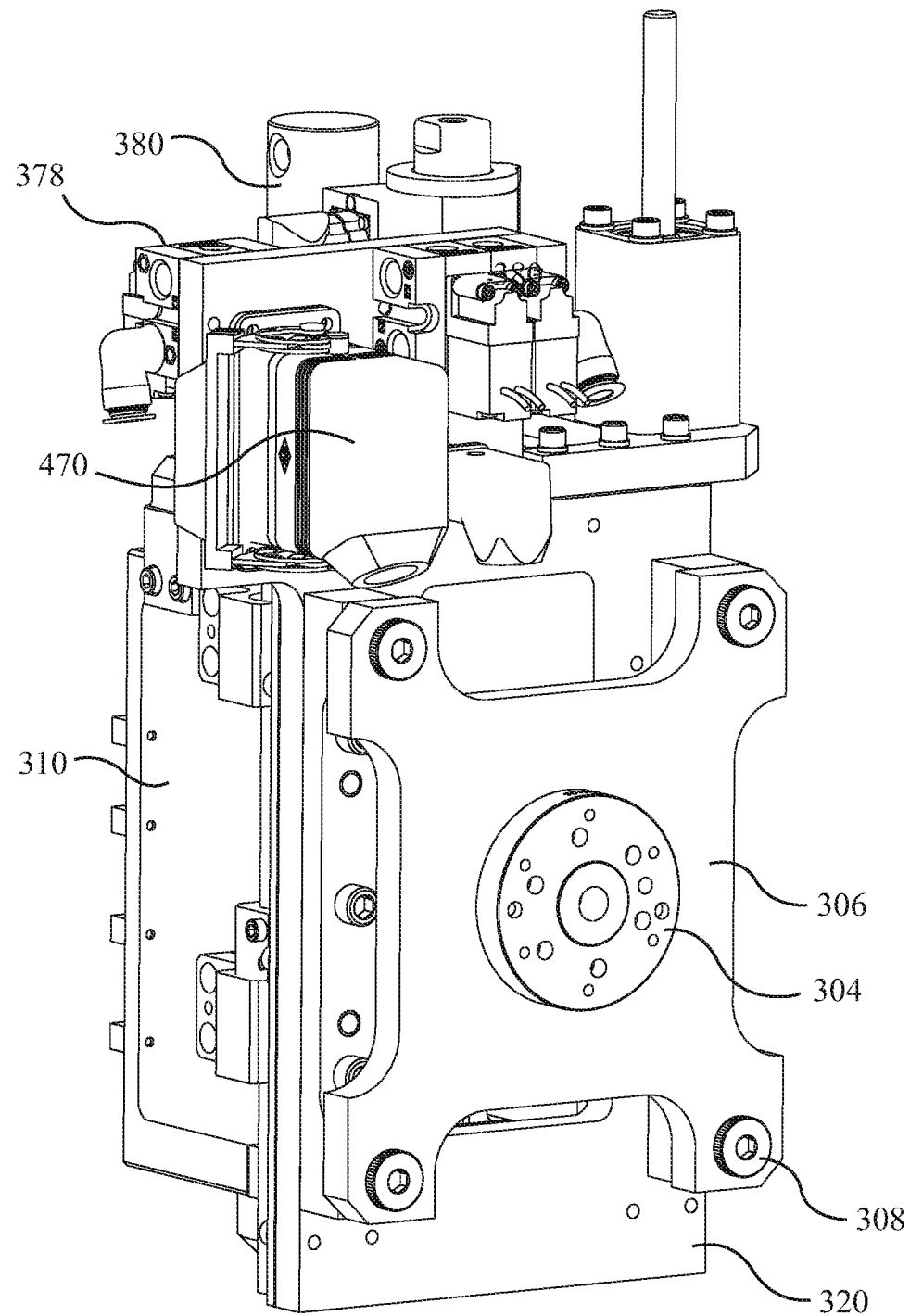
Figure 17A:
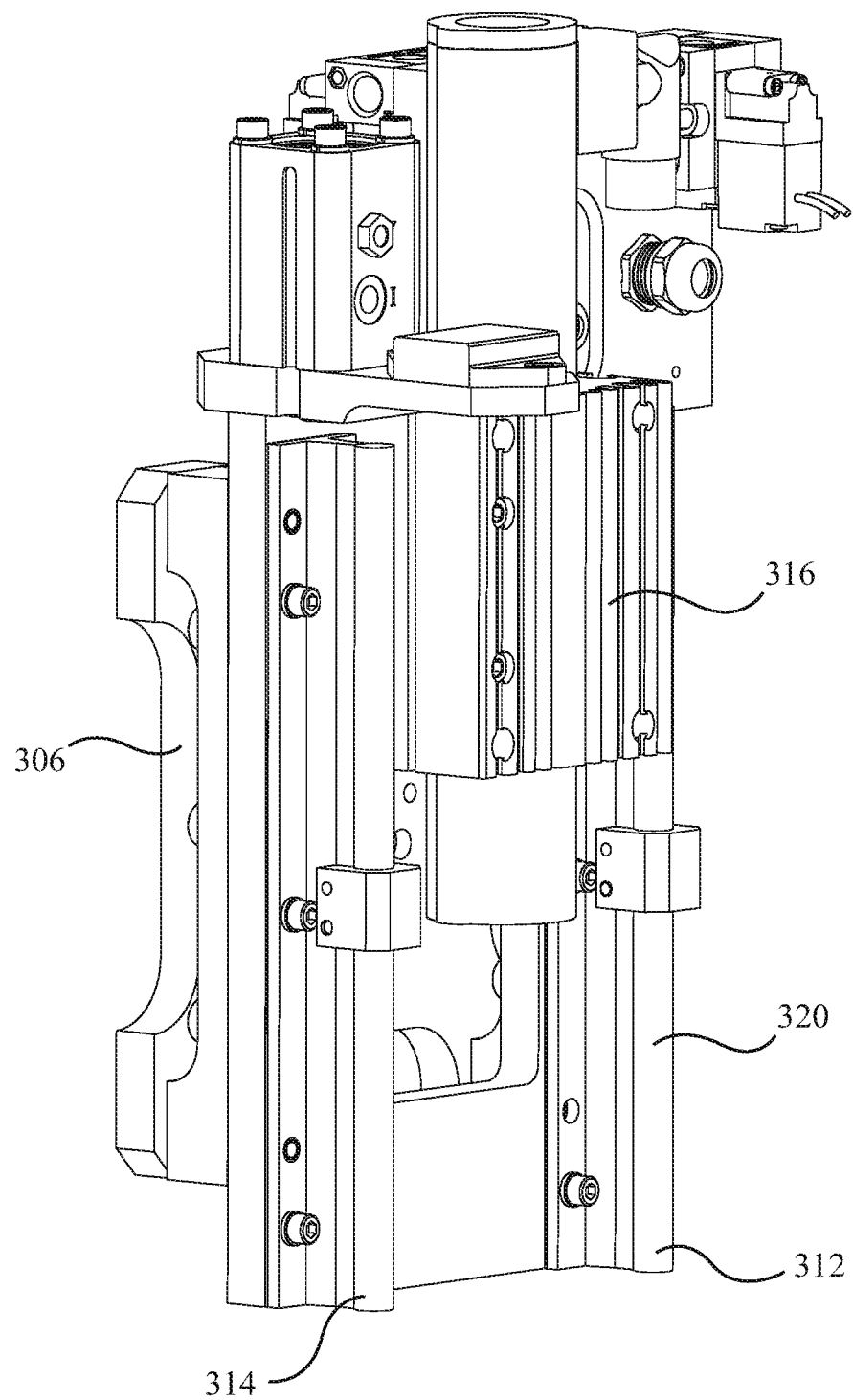
Figure 17B:
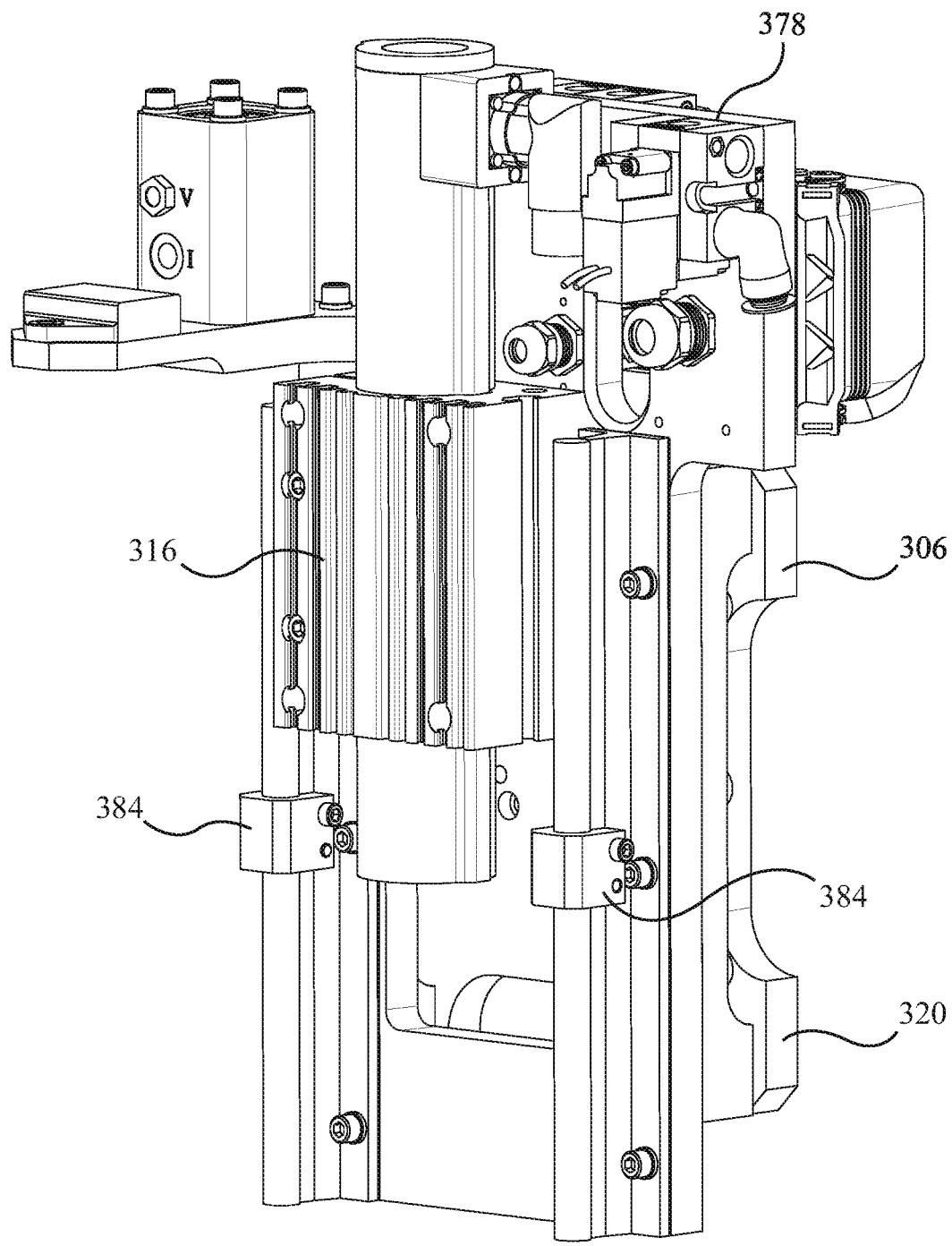
Figure 18A:
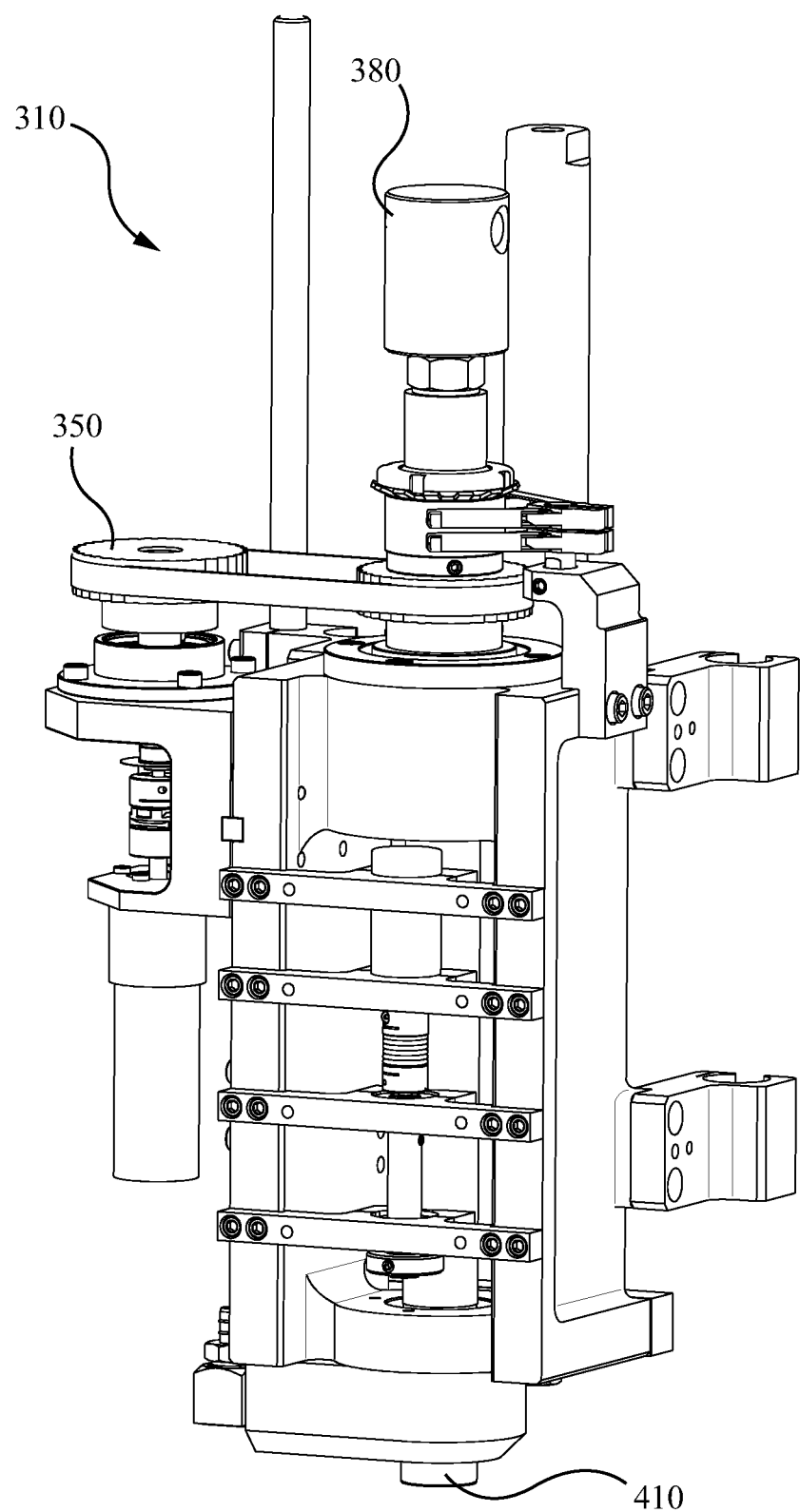
FIG. 18a shows a tool and carriage of the coating apparatus of FIG. 14a from in front and to the right.
Figure 18B:
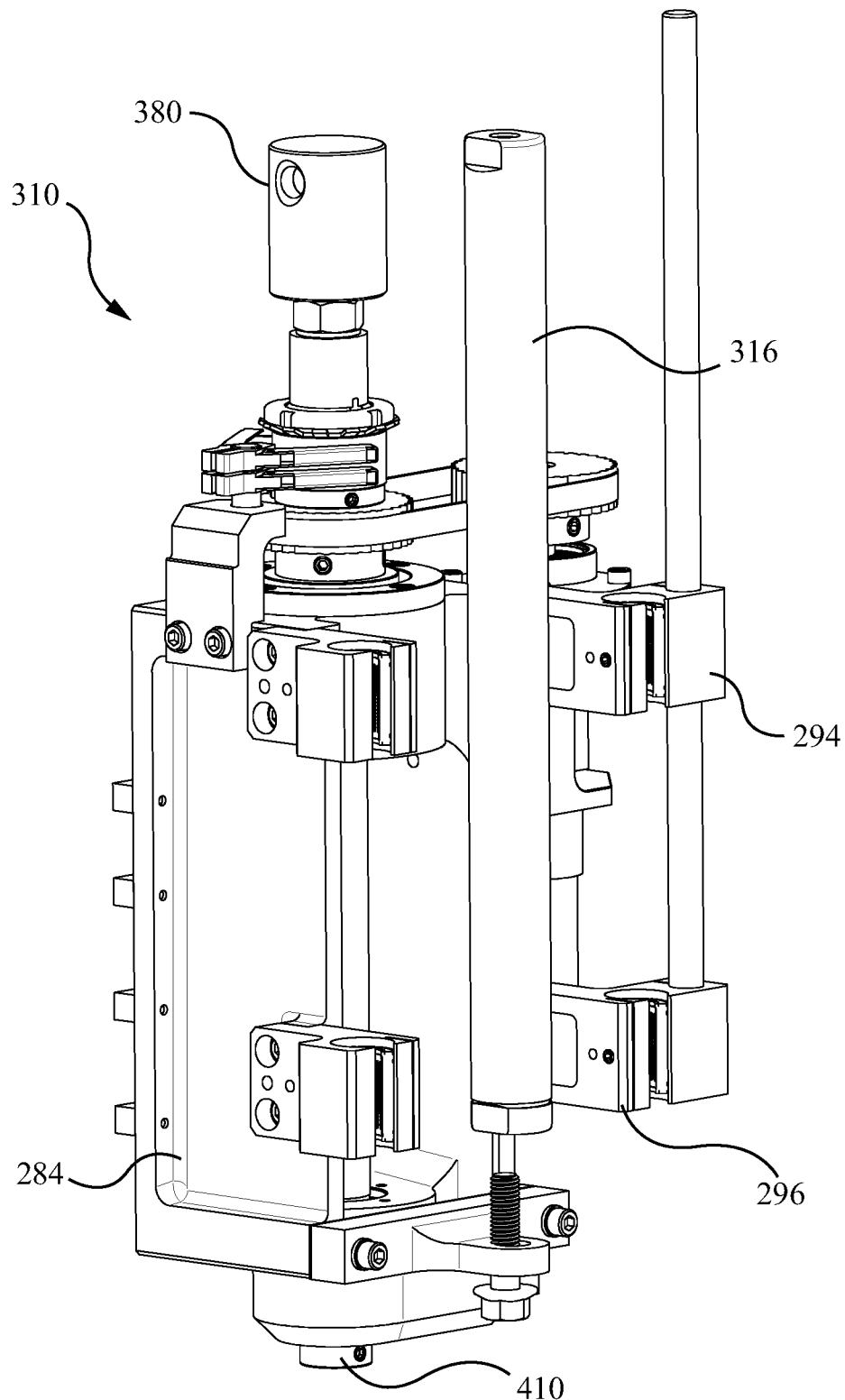
FIG. 18b shows the tool and carriage of FIG. 18a from behind and to the right.
Figures 19A, 19B, 19C, 19D:
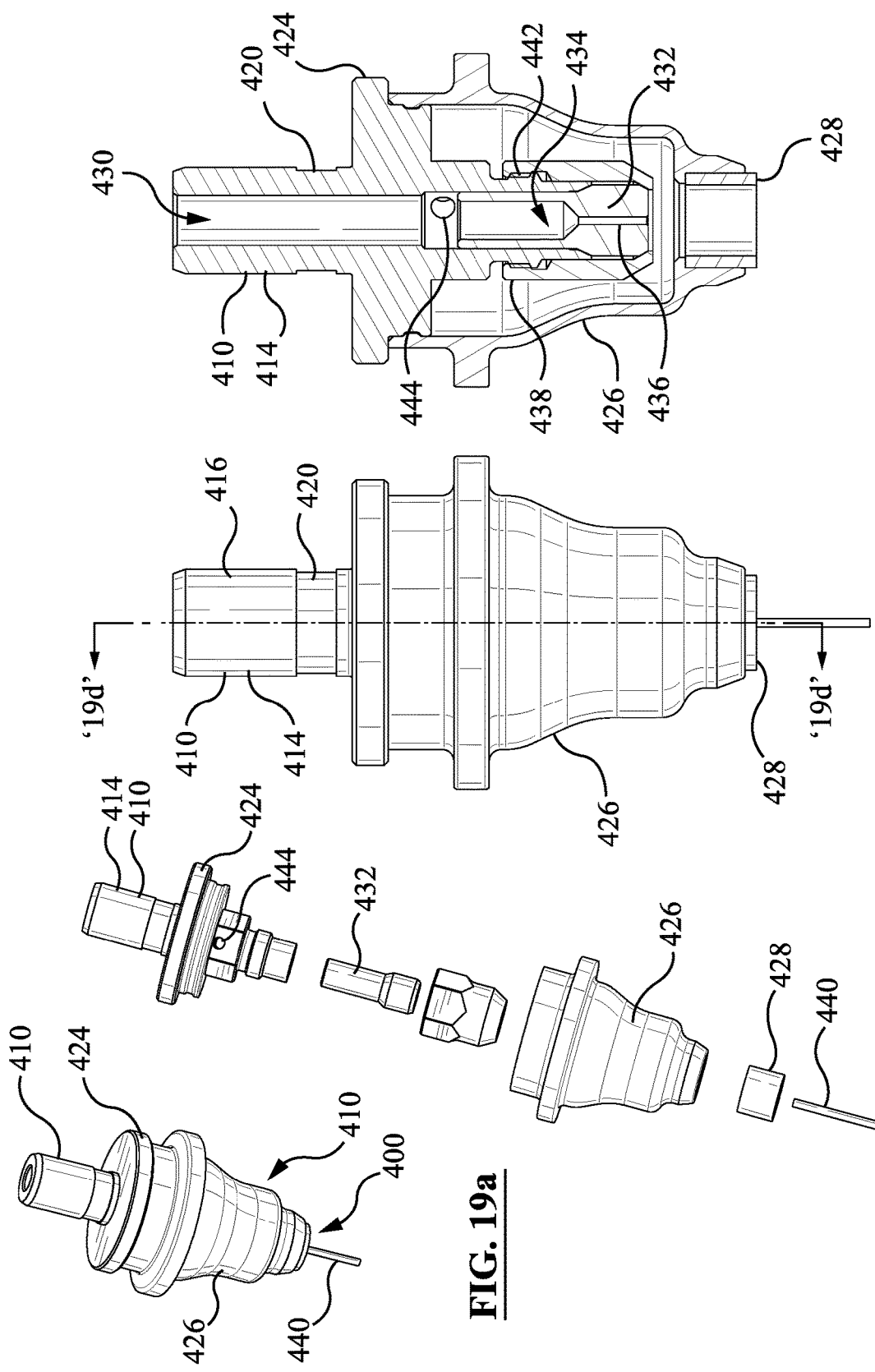

Similarly, In FIGS. 11a and 11b there is a simpler embodiment of welding apparatus 200 that has a first drive 202 including a variable speed motor 204, but does not have a second drive, i.e., there is no rotating oscillator. Apparatus 200 does, however, have an output feedback control 206 that includes digital encoder 208 that is used to maintain a relatively smooth output speed of rotation of the welding rod. In the further alternate embodiment of FIGS. 12a and 12b, there is a welding apparatus 220 that has a first drive 222 that has a liquid cooling jacket 224 to cool the electrode holder, as described above. The embodiments of FIGS. 10a and 10b, 11a and 11b, and 12a and 12b are intended to show that the various features may be employed alone or in combination.

In terms of motors, the first drive may have an AC motor or a DC motor. In one embodiment it may be a 12 VDC Pittman Brush Motor with a no-load speed of 6500 rpm and a low speed of 500 rpm. Another embodiment of this motor may have a no-load speed of 6200 rpm, and a low speed of 300 rpm. In another embodiment it may be a 12 VDC servo motor with a speed range of 200-827 rpm; in another embodiment it may be a 24 VDC servo motor with a speed range of 500-1481 rpm. In still another embodiment, the first drive motor may be a DC servo motor having a no load speed of 7200 rpm and a low speed of 2200 rpm. That motor may have a gear reducer on the output side. As the various motors are, or may be, of different sizes, adapters 190, 192 may be used at one or both of the front and rear end to fit the motor into the mounting cavity defined in the molded housing, thereby permitting any of the motor embodiments to be used depending on, e.g., cost and availability. There may be a feed-back control system that includes a digital sensor, or digital encoder, mounted to observe output shaft speed. Inferentially, the monitoring of motor current, which may also be controlled, may typically also be a measure of output shaft torque. Output shaft torque may tend to fluctuate, e.g., when rod contact with the workpiece is broken, or when the rod starts to stick. The second drive, i.e., of the oscillator, may also be either an AC drive or a DC drive.

In the embodiments of FIGS. 13*a* through 20*d*, there is an automated low energy welding (LEW) applicator unit identified as a welding or coating apparatus 300. It interfaces with, i.e., mounts on and operates in cooperation with, a robot 250 and its power supply. The apparatus automatically applies LEW coatings and repairs and welds as programmed. That is, the robot is programmed to present the coating apparatus to a workpiece according to a pre-programmed path, where the path may follow the surface of the workpiece, whether that surface is flat or has a curvature. It may follow a particular path, as where the operation is to lay down a particular configuration of welding material, whether to follow a crack or defect in making a repair, or in building up a low energy weld of several passes, and so on.

Robot 250 is a multiple degree of freedom robot, such as may be purchased commercially, as, for example, from ABB. In the example, the robot has a base 252 such as may be mounted to stationary structure (e.g., a concrete floor, or other suitable pedestal), as may be. The workpiece is then positioned in a known location relative to robot 250. Robot 250 may include a laser sensing system to establish the relative location of the workpiece. The workpiece may itself be mounted on a pedestal or bed and may be stationary. Alternatively, the workpiece may be moving, as along an assembly line, whether continuously or intermittently, according to either a pre-determined path, or according to a path that can be sensed by the robot such that the relative position, orientation, and motion of the workpiece are known in the sense of the robot having the ability to correlate the path of tool operation to the workpiece. For ease of explanation, the workpiece is stationary during welding or coating, unless otherwise noted.

Robot 250 has a first degree of freedom, namely freedom of rotation about the vertical axis between the robot first member, or shoulder 254 and base 252. Robot 250 has a second degree of freedom of motion, namely angular rotation of upper arm 256 about the shoulder joint 258. Robot 250 has a third degree of freedom of motion, namely angular rotation of the forearm 260 relative to upper arm 256 about elbow joint 262. Elbow joint 262 may have an axis parallel to the pivot axis of shoulder joint 258. As such, motion of upper arm 256 and forearm 260 can place wrist 270 in a wide selection of positions in the radially extending plane perpendicular to the shoulder joint and elbow joint axes. Forearm 260 may have a further rotational degree of freedom about its long axis. Wrist 270 has a hand, or finger, or knuckle that has a further rotational degree of freedom about the pivot axis of wrist joint 272. Apparatus 300 has a mounting interface, or base, or plate 304 that mounts to a knuckle of robot 250, the knuckle being carried on a spindle extending from wrist 270. That knuckle may also have a rotational degree of freedom about its own longitudinal spindle axis such that plate 304 may be rotated. Plate 304 itself is mounted to a resilient intermediate member, or resilient suspension member 306. These multiple degrees of freedom permit the welding head, i.e., apparatus 300, to be oriented in a wide variety of locations and orientations to engage the workpiece.

Apparatus 300 has a head or carriage 310 that mounts on a base, or slide, or slides 320. The base, or slide, or slides 320 are mounted to the resilient intermediate member, or suspension member, 306. Resilient suspension member 306 may include springs or springs and dampers. In one embodiment it may have the form of a substantially stiff polymeric plate, which may be made of a Nylon™ or UHMW polymer. In other embodiments member 306 may be made of a metal, such as steel, and may be electrically insulated from the body of robot 250. While apparently rigid, such a plate is not rigid in the manner of a thick steel plate, and, being polymeric, has much higher anelasticity. It is, by the nature of the material, a damper or moderator of high frequency vibration. The plate is substantially rectangular, or, rather, has a substantially rectangular mounting fitting connection footprint at which the slide or slides, or base 320 is attached, e.g., on the front side of resilient support member 306. Resilient support member 306 also has a fastener footprint corresponding to the fastener footprint of mounting face plate 304, which, in this case, may be a circular mounting place of a diameter falling within the rectangular shape of resilient suspension member 306. As shown plate 304 has a diameter that is about half the width of the generally rectangular, or four-cornered shape of resilient suspension member 306. The fastener fittings at the corners of the plate, identified at 308 may be provided with resilient bushings or gaskets. Suspension member 306 may be non-electrically conductive. Suspension member 306 may tend to attenuate relatively high frequency vibration, such that vibration in apparatus 300 may tend to be isolated to some extent from robot 250. Apparatus 300 is connected through resilient suspension member 306 and mounting plate 304. When mounting plate 304 is installed on the spindle emanating from wrist 370, slides 320 travel with, and have their position, motion, and orientation dictated by the position of wrist 370.

Carriage 310 is mounted on guideways, slides, or rails 312, 314 so that it has a degree of freedom of motion, in this instance in linear translation, along those guideways. In the orientation shown in FIG. 13*a*, this would yield motion in vertical translation. Clearly, the direction of motion, whether vertical, horizontal, lateral, or some combination of components thereof, will be dictated by the orientation of wrist 270, and is variable according to the programming of robot 250. Apparatus 300 includes a drive 316 that causes carriage 310 to move along rails 312, 314. Drive 316 may be a screw drive, e.g., an Acme screw, or it may be a pneumatic or hydraulic drive. In this instance, a pneumatic drive may be convenient. There is also a brake, 318, which, in the embodiment illustrated is an air brake. It could be a magnetic or friction brake. Axial-direction drive 316 mounted is midway between rails 314, 314, such that all three of items 312, 314 and 316 are roughly co-planar. While this need not necessarily be so, the use of a co-planar, or approximately co-planar mounting may tend to reduce or avoid secondary eccentric, out-of-plane forces that may not aid in the smooth operation of apparatus 300. A symmetrical co-planar mounting may tend to be simple, and convenient. There is also an adjustable over-travel limit abutment, 308 rigidly mounted to carriage 310. The adjustment may have the form of a lag bolt, or threaded rod that is adjusted to set a limit on upward travel of carriage 310 relative to the base or slide or slides.

Apparatus 300 has a spindle assembly 330. In the most general case, spindle assembly may have a tool engagement interface 322 to which a variety of tools may be attached—drills, arbors, mills, and so on—in addition to the welding or coating equipment described herein. Too engagement interface 322 may include a socket for receiving the shank of the tool. Spindle assembly 330 is mounted in main bearings 324, 326, and a forward pilot bearing 328. Main bearings 324, 326 may be angular contact bearings. Pilot bearing 328 may have clearance to accommodate vibration as induced in the apparatus. A timing gear, or pulley, or sheave 332 is mounted to drive the spindle shaft 334 which extends longitudinally through the various bearings. Shaft 334 is electrically conductive. Slip rings 336 are mounted to the end of shaft 334 and receive power from brushes 338 (which are connected to a power supply), to the power input to shaft 334. Dampers, in the form of damper springs 340, 342 may be mounted axially outside, i.e., bracketing, main bearings 324, 326. A main spindle drive 344 is mounted to carriage 310 and includes a motor 346 and transmission 348. The motor can be a servo motor as described in the embodiments above. In this instance, transmission 348 has the form of a timing belt. It is driven by the output pinion or pulley or sheave 350 of motor 346, and carries motion to the input gear, or pulley, or sheave 332 of spindle shaft 334. The timing belt is non-electrically conductive. As may be understood, motor 346 operates at a given motor speed, and is comparable to any of the main drives described above in terms of speed of rotation. As before, the motor speed may be digitally controlled, as by use of an encoder 352 and associated feedback loop. This arrangement may be substantially the same as the encoder examples above.

Carriage 310 has first and second laterally extending structural members or frames, such as may be identified as a head frame 280, a tail frame 282, and left and right hand side frames 284, 286. Head frame 280 is substantially or predominantly cylindrical, and has an axial extent greater than the axial spacing of main bearings 324, 326. The main bearings 324, 326 of spindle shaft 334 of spindle assembly 330 are mounted in headframe 280. Pilot bearing 328 is likewise mounted in tail frame 282. Side frames 284, 286 form a pair of spaced apart axially extending beams whose lateral spacing and orientation is governed by head frame 280 and tail frame 282. Similarly, side frames 284, 286 provide the structural rigidity and define the stiffness of carriage 310 in respect of maintaining the spacing and orientation of headframe 280 and tail frame 282 relative to each other. Upper and lower slide followers 294, 296 are mounted to the near margins of side frames 284, 286 to engage the slide rails, 312, 314. It may be noted that the axial drive is mid-way between rails 312, 314, and that all three.

Apparatus 300 also includes an offset oscillator or vibration source 360, which, to avoid repetition of explanation, may be the same as, or substantially the same as, in the embodiments above. That is, there is a vibrator servo motor 364, which drives through a clutch 366, thereby turning an output shaft 368 carried in bearings 372, 374. An eccentric 376 is mounted to the far end of driven output shaft 368. Servo motor 364 is secured in position by mounting frames 290 that attach to the outside (i.e., furthest away from wrist 270) margins of side frames 284, 286. Similarly, mounting members, or frames, 292, also mounted to the outside margins of side frames 284, 286, secure oscillator bearings 370, 372 in position. Again, this arrangement may be the same as, or substantially the same as, the oscillator arrangements noted above. The oscillator need not be mounted on an axis parallel to the spindle axis. It is, however, convenient, and relatively compact, for these axes to be parallel.

Inasmuch as spindle shaft 334 is hollow, it is able to conduct shielding gas to the tool. To that end, a gas supply manifold 380 is provided in the form of a rotating union shielding gas fitting mounted to the end of shaft 334 distant from the workpiece. At the opposite end of shaft 334 there is an O-ring seal 382 to prevent diversion of shielding gas. The flow of shielding gas is governed by a solenoid controlled valve 378 having on and off positions or conditions.

Carriage 310 is constrained to travel within a permitted range of travel. To that end there are left and right hand linear slides that have respective left and right hand fixed stops 384. Carriage 310 has upper and lower indexing fittings 386, 388, having the form of slide followers 294, 296 that mate with the linear slide. The upper and lower fittings alternately bottom, or run into, or abut, on fixed stop 384 at the upper and lower limits of travel.

A cooling jacket 390 may be mounted to carriage 310. That mounting may be to the distal face (i.e., the face oriented toward the workpiece) of tail frame 282. Cooling jacket 390 may include upper and lower seals 392 that engage the outside of spindle shaft 334. Cooling jacket 390 includes an annular cooling manifold 394 formed therein for the circulation of liquid coolant, and has liquid coolant inlet and outlet fittings 396, 398.

The application tool 400 is mounted at the distal end of spindle shaft 334. Application tool 400 may, in general, be any kind of tool that could be mounted to the end of a robot arm or milling machine, whether a welding or coating applicator or some other tool such as a drill, an end mill, an arbor, a grinder, or such as may be.

In the embodiment of FIGS. 19a-19d, application tool 400 is a manually changed welding deposition of coating tool 410. Tool 410 may be referred to generally as a "chuck assembly", or merely a chuck. Tool 410 includes a spindle or chuck (i.e., the actual chuck fitting itself, as opposed to the overall chuck assembly), indicated as 414. Chuck 414 has a root or stub shaft 416 that fits closely within spindle shaft 334, and engages the inside of a seal, such as an O-ring seal or gas seal 382 mounted inside hollow spindle shaft 334. The outside of shaft 416 includes a securement engagement fitting 420. In the embodiment shown, securement engagement fitting 420 has the form of an external circumferential slot or groove or channel that is engaged by a mating locking fitting of spindle assembly 330. Fitting 420 will include a torque-receiving element. The locking fitting 422 (FIG. 15b) may be a circlip or circumferential spring clip, or screw fitting, or clamp that seats in a mating fitting of spindle shaft 334. The locking fitting (or fittings) secure chuck 414 so that torque is transmitted from shaft 334 to chuck 414. In the embodiment shown, fitting 422 is a lateral key and fitting 420 has a geometry, such as a spline or channel, or socket that mates with the key.

Chuck 414 has a radially outwardly extending flange 424. The radially outward margin of flange 424 is profiled to mate with the wider portion of a shielding gas cowling or shell, or housing, or skirt 426 that defines within it a chamber 426. Cowling 426 is open at its distal end, and provides a seat for an end member that may have the form of a sleeve or cuff 428 that is hollow in the center and provides an outlet passage for the shielding gas. Cuff 428 may be made of a ceramic material. The ceramic material may tend to be suitable for high temperature use in a corrosive environment. In some instances cuff 428 may be mitred.

Chuck 414 has a through bore 430. The distal end of through bore 430 is widened and tapered to receive the shank of a collet 432, which has a matching taper. Collet 432 has an internal longitudinal passageway 434 that ends in an accommodation 436 for a welding electrode rod 440 such as may be used in operation with apparatus 300. Rod 440 will be mad of such welding material as suitable for the welding or coating operation, be it a steel alloy, a nickel or nickel alloy, an aluminum alloy, copper or a copper alloy, molybdenum or a molybdenum allow, titanium or a titanium alloy, or a carbide of boride ceramic composition, such as titanium carbide or titanium di-boride, or such other material noted hereinabove, or as may be. An internally threaded end piece of collet nut 438 engages the outside threads of the distal end of chuck 414 as at 442, causing the chamfered inside end of collet nut 438 to urge collet 432 into the tapered mouth of bore 430, thus compressing collet 432 and clamping rod 440 in position. Chuck 414 and collet 432 are electrically conductive, and so carry electrical current from spindle shaft 334 into rod 440. Chuck 414 has a passageway, or conduit, or gas vent 444 by which shielding gas conveyed along the inside of shaft 334 is permitted to flow to chamber 426, and thence outwardly through cuff 428 which is mounted concentrically about rod 440.

In the embodiment of FIGS. 20a-20d, application tool 400 is a manually changed welding deposition of coating tool 450. Tool 450 may be referred to generally as a "quick release chuck assembly", or merely a chuck. In this case, rather than having chuck 410 that seats directly in the end of spindle shaft 334, a chuck 452 is seated in an intermediate fitting, or adapter, 448, such as may be known as an "HSK Holder". Chuck 452 is threaded or otherwise secured into the output end of adapter 448, and the near end of adapter 448 fits to spindle shaft 334 by a releasable securement fitting. Adapter 448 is changed by moving robot 250 to present tool 400 to a tool changer that is designed to interact automatically with adapter 448. The HSK holder and the automatic tool changing equipment are available from commercial suppliers.

From that point forward, tool 450 is substantially the same as, or similar to tool 410, although the gas cowling or gas shield 460 may be more compact and predominantly cylindrically sided, as at 462, giving a smaller internal chamber 464 since the upstream mounting is to the outside threaded portion of the HSK holder, as at 466, rather than to the radially larger flange of chuck 412 described above. Tool 450, as assembled, is shown in FIG. 20d.

In all cases, apparatus 300 and robot 250 are provided with appropriate electrical connectors (as at 470), pneumatic, and fluid connections, piping, and other ancillary fittings to supply electrical power, whether AC or DC, compressed air, and hydraulic or cooling fluid, such as may be required. These ancillary fittings are understood to be conventional. Apparatus 300 is also provided with sensors such as an inclinometer 472, as well as vibration, motion, and force sensors. The feedback from these sensors allows apparatus 300 to adjust as welding is progressing, e.g., as welding rod 440 is being consumed, it may automatically adjust the axial position of carriage 310 to advance toward the workpiece.

The use of an automatic tool changer and a programmable robot permits apparatus 300 to be used to lay down a welding pass, or a coating pass of material, be it steel, nickel, molybdenum, or such other material, and then, without releasing the workpiece from its accurately known position and orientation, to dress the surface with another tool, be it a drill bit, an end mill, an arbor, or a grinder, as may be appropriate to yield a finished, machined part. Alternatively, it permits a new welding rod to be installed without significant delay. That is, where more than one tool 450 is provided, one can be kept in readiness with a new welding rod while another tool 450 is being used. When the rod is eaten away in use, tools 450 can be swapped out automatically. I.e., the head control automatically stops the progress of the head, retracts the tool to the upwardly withdrawn position, (i.e., the "datum gauge line), and then the machine swaps out the head. The new head has a rod that has been engaged to a pre-set length, set to a gauge length. The programmed machine is given the gauge length as a known parameter, and so returns apparatus 300 to the workpiece with the new welding rod installed, at the correct position and height to continue from the point of interruption (i.e., the previous stopping point). With the new holder tool in place, with the new electrode, the machine moves to the last position and restarts the LEW process where it left off (or at such other location or for such other task as it may have been programmed to perform after swapping one tool for another).

The new replacement rod can be installed in the out-of-service tool 450 while the other tool 450 is working. This replacement can also be an automated process. Furthermore, it is possible to use different welding rod compositions with successive tools. For example, a first pass or treatment may lay down a coating of nickel on copper. A subsequent pass may lay down a coating of titanium carbide on the nickel. Similarly, an initial pass or treatment may coat steel with molybdenum, while another coating, perhaps on a different area, lays down a pass of titanium or a ceramic composition. In these examples, since they do not involve a manual tool change, apparatus 300 may be installed within a controlled environment, which may be flushed with shielding gas, or which may involve exposure to high temperatures or to corrosive or otherwise harmful processing substances.

As noted above, "Low Energy Welding" tends to involve spark deposition of welding or coating material in which the energy of deposit is of the order of 1 J per spark, as opposed to a 1000 J to 10,000 J of a continuous arc weld. The spark deposition, or "Low Energy Welding" approach may tend to yield a very small heat affected zone. The coating thickness may be in the range of 0.050" (or less) up to 0.100". Up to now, Low Energy Welding has been a hand-held process, often dependent upon the manual skill and intuition of the operator. Apparatus 300 may be suitable for mounting on an existing CNC machine tool or robot that controls the path of coating or welding in the same manner as would be done with an end mill, while retaining the rotation, vibration, and peening capabilities of the above described hand-held units. Using force, current, and motion feedback, the apparatus adjusts electrode stick-out according to the controlled, programmed pattern of direction, angle, and force. The frequency of the electrical supply, the speed of electrode rotation, and the frequency of vibration are all adjustable (or fixed) as welding occurs. Spindle speed is known, because it is monitored, and can be adjusted in real-time, thereby tending to permit a more consistent processing of a workpiece, and promoting consistency of processing from workpiece to workpiece.

The coating head itself, i.e., the apparatus on carriage 310, is a sliding coating head. It is driven by a linear servo motor that governs axial position. The spindle can be driven by different motor systems, depending on the coating speed required. Encoder feedback is provided to permit spindle rotational speed to be monitored and adjusted (e.g., stabilized) during processing. The system may provide the quick-change capability described above; a shielding gas flushing or flooding capability; vibration of the spindle nose; provision of electrical power to the spindle through the main slip-ring connection; and water cooling of the hot end of the spindle. As described, in the embodiments above both the electro-spark deposition (ESD) electrical power and the shielding gas are supplied at the rear or distant end of shaft 334 and carried axially along shaft 334 to the electrode.

In some embodiments, more than one welding or coating apparatus 300 may be used at the same time, as where multiple passes are to be made, or one material is to be deposited upon another, or where a large area is to be treated.

Although the various embodiments have been illustrated and described herein, the principles of the present invention are not limited to these specific examples which are given by way of illustration, but only by a purposive reading of the claims.

We claim:

1. An automated welding apparatus for holding a welding electrode for use in applying an electro-spark discharge (ESD) coating to a workpiece, the welding electrode having a long axis, said welding apparatus comprising:
   a multi-degree-of-freedom programmable robot;
   an ESD power supply;
   an ESD welding head mounted to said robot, said ESD welding head being electrically connected to said ESD power supply;
   said ESD welding head including
      a holder in which to receive the welding electrode;
      an electrical connection attached to said holder, by which to apply electricity from the ESD power supply thereto, and thereby, in use, to the welding electrode;
      a first drive mounted to rotate the electrode holder, and to rotate the welding electrode about the long axis of the welding electrode;
      a vibrator that includes an imbalance member and a second drive mounted to move said imbalance member; said vibrator being operable to move said welding electrode in vibrating intermittent contact with the workpiece, said second drive being off-set laterally from the long axis of the welding electrode;
   said robot is operable to convey the welding head along a path corresponding to a workpiece surface;
   said welding electrode has a welding rod;
   said robot is operable to advance the welding rod to engage the workpiece;
   said robot is operable to drive said welding rod rotationally about its own axis; and
   said robot is operable to vibrate said welding rod independently of driving the welding rod rotationally.

2. The welding apparatus of claim 1 wherein either of said first drive and said second drive is a variable speed drive, and said second drive is independently operable from said first drive to permit said second drive be operated at a different output frequency from said first drive to change the frequency of vibration of the welding electrode relative to the workpiece.

3. The welding apparatus of claim 1 wherein said second drive of said vibrator has an axis of rotation parallel to said first drive.

4. The welding apparatus of claim 1 wherein said apparatus includes an inert gas delivery manifold; said holder has a gas shield cowling; and said apparatus includes a gas conduit connection having a discharge oriented to convey gas within said cowling.

5. The welding apparatus of claim 1 wherein said apparatus has a housing, and said first and second drives are mounted on parallel axes within said housing.

6. The welding apparatus of claim 1 wherein said first drive has a feedback control connected to govern output speed, and said feedback control includes a digital encoder sensor mounted to observe output of said first drive, and a digital controller operable to adjust motor drive speed in response thereto.

7. The welding apparatus of claim 1 wherein said first drive has an output speed in the range of 100 to 500 rpm, and said second drive of said vibrator has an output speed of 300 to 3000 rpm.

8. The welding apparatus of claim 1 wherein:
   said first drive has a feedback controller;
   said second drive is a rotational drive offset having an axis of rotation parallel to said first drive;
   said second drive is independent of said first drive; and
   said holder is liquid cooled.

9. The welding apparatus of claim 1 wherein said welding apparatus has a resilient mounting by which said welding head is mounted to said robot.

10. The welding apparatus of claim 1 wherein said welding head includes a base mounted to said robot, a carriage slidably mounted to said base; and a drive mounted controllably to move said carriage relative to said base.

11. The automated welding apparatus of claim 1 wherein said apparatus is capable of sensing contact force by a sensor on the welding rod and is operable to adjust welding rod extension in response to the force monitored on the welding rod.

12. The automated welding apparatus of claim 11 wherein said apparatus is programmed to adjust both the welding rod extension and rotational speed of the welding rod in response to feedback from the sensor.

13. The automated welding apparatus of claims 11 wherein said apparatus is programmed to adjust electrical duty cycle of electrical current to the welding rod as the robot moves the welding head relative to the workpiece.

14. The automated welding apparatus of claim 1, wherein there is a feedback controller mounted to govern said first drive.

15. The automated welding apparatus of claim 14 wherein said feedback controller has a sensor mounted to monitor output rotation of said holder, and an output operable to govern motor speed in response thereto; said sensor includes a digital encoder, and speed of said first drive is digitally controlled.

16. The automated welding apparatus of claim 15 wherein said second drive has an output speed of between 300 rpm and 3000 rpm; said first drive has an output speed in the range of 100 to 500 rpm; said holder is liquid cooled; said apparatus has an inert gas delivery manifold mounted to bathe the electrode; said welding head includes a base mounted to said robot, a carriage slidably mounted to said base; and a drive mounted controllably to move said carriage relative to said base; said robot is programmable to convey said welding head along a path corresponding to a the workpiece surface; and motion of said carriage relative to said slide is feedback controlled.

17. The welding apparatus of claim 1 wherein said electrode holder is liquid cooled.

18. The welding apparatus of claim 1 wherein, said second drive including a motor and the imbalance driven by said motor rotationally; said second drive has an output speed of between 300 rpm and 3000 rpm; said first drive has an output speed in the range of 100 to 500 rpm; said first drive includes a gear reducer; and a feedback controller is mounted to govern said first drive; and said feedback controller has a sensor mounted to monitor output rotation of said holder, and an output operable to govern motor speed in response thereto, said sensor includes a digital encoder, and the speed of said first drive is digitally controlled.

19. The welding apparatus of claim 1 wherein said apparatus has an inert gas delivery manifold mounted to bathe the electrode; said apparatus includes an inert gas supply manifold that has a discharge enveloping the electrode; and a liquid cooling jacket surrounds said electrode holder.

* * * * *